United States Patent [19]

Erwin et al.

[11] Patent Number: 4,691,295

[45] Date of Patent: Sep. 1, 1987

[54] SYSTEM FOR STORING AND RETREIVING DISPLAY INFORMATION IN A PLURALITY OF MEMORY PLANES

[75] Inventors: Douglas A. Erwin; Robert L. Skinner, both of Austin, Tex.

[73] Assignee: Data General Corporation, Westboro, Mass.

[21] Appl. No.: 470,698

[22] Filed: Feb. 28, 1983

[51] Int. Cl.⁴ ...................... G06F 12/00; G06F 3/153; G09G 1/02

[52] U.S. Cl. .................................... 364/900; 364/521; 340/747; 340/750; 340/798; 365/230

[58] Field of Search ... 364/200 MS File, 900 MS File, 364/518, 521, 522; 340/703, 750, 749, 798, 747; 365/230

[56] References Cited

U.S. PATENT DOCUMENTS 4,055,754 10/1977 Chesley ................................ 371/21
4,303,986 12/1981 Lans .................................... 364/900
4,435,792 3/1984 Bechtolsheim ...................... 365/230
4,509,043 4/1985 Mossaides .......................... 340/721

*Primary Examiner*—Archie E. Williams, Jr.
*Assistant Examiner*—Thomas C. Lee
*Attorney, Agent, or Firm*—Robert Dulaney

[57] ABSTRACT

Apparatus for storing and retrieving display information in the memory of a video display terminal is disclosed. Terminal processor logical addresses are mapped into terminal memory in both a pixel address format and a word address format. Terminal memory is divided into four planes, each plane containing one bit of the 4-bit ordinal associated with each pixel in the color display image. Address interface logic generates the appropriate RAM row and column addresses based on the type of memory access and the purpose of the access. A plurality of separate write enable signals, separate upper and lower column address strobe signals and separate row address strobes for each plane allow flexibility in placing data in or removing data from terminal memory planes.

3 Claims, 18 Drawing Figures

TERMINAL 100

SYSTEM FOR STORING AND RETREIVING DISPLAY INFORMATION IN A PLURALITY OF MEMORY PLANES

CROSS-REFERENCE TO RELATED APPLICATIONS

This application is related in part to copending applications Ser. No. 470,699 filed Feb. 28, 1983 now U.S. Pat. No. 4,616,260 and Ser. No. 470,697 filed Feb. 28, 1983.

BACKGROUND OF THE INVENTION

1. Field of the Invention

This invention is related generally to display terminals and more specifically to apparatus, for use with a bit-mapped raster scanned graphics terminal, to store and retrieve graphics display data in either a word or a pixel format.

2. Description of the Prior Art

The picture displayed on a video monitor screen can be considered to consist of a large number of generally horizontal, parallel "raster lines" or lines of displayed information. As the monitor's electron beam scans along each line, locations on the face of the cathode ray tube are stimulated. Each such location is commonly termed a pixel and the resolution of the screen is specified as the number of lines displayed multiplied by the number of pixels on each line. In a color monitor, the colors are generated by differentially activating red, blue and green electron guns which are aimed at three very close, but not coincident, points on the screen face.

Raster scan graphics terminals are typically designed as either character or bit-mapped terminals. In character graphics, the displayed picture is made up of a combination of predefined alphanumeric characters and simple shapes, with each character or shape being a matrix of pixels (e.g. 8×10) which has a single address in terminal memory. In bit-mapped graphics, every pixel is associated with one or more locations in memory. In a monochrome terminal, a single bit per pixel would be adequate to describe the pixel state. In a color terminal, however, multiple bits per pixel are required. For example, if it is desired to be able to display up to 16 different colors on the screen simultaneously, each pixel must have four bits associated with it to define its color. The bits of color information associated with each pixel may, in some implementations, not define a color, but rather define a location in a table which contains the color information currently assigned to those bits.

Prior art terminals commonly have only a single mode of accessing and modifying pixel information in the memory of a bit-mapped terminal. Usually pixels are accessed individually. This method allows each pixel to be independently modified but is time consuming and not desirable for all possible terminal applications.

SUMMARY OF THE INVENTION

Novel memory control method and apparatus for use in a video display terminal is disclosed. In a terminal having a memory in accordance with the disclosed method, the physical memory of the terminal is considered as being organized into a plurality of planes, each plane having 1 bit of each multibit pixel ordinal stored therein, the data in each plane being organized such that the data for any pixel has the same memory address in each plane and the data being further organized such that the relative vertical and horizontal location of each pixel in the display image is translatable to the pixel memory address. A preferred embodiment of the invention incorporates apparatus for generating row and column addresses, apparatus for generating first address strobe signals, each of which is supplied to only one plane and apparatus for generating second address strobe signals, each of which is supplied to a portion of all planes.

It is another feature of the invention that apparatus is included for generating a plurality of memory write enable signals to each plane.

It is yet another feature that the row and column addresses generated are based on the type of memory access and the purpose of the memory access.

It is still another feature of the invention that the apparatus for receiving the memory outputs can supply the memory outputs of each plane to the terminal display logic, can supply one selected bit from each plane to the terminal processor or can supply all outputs from one plane to the terminal processor.

It is an advantage of the present invention that several types of memory access are available to allow terminal processor resources to be efficiently used to accomplish the desired operation.

Other features and advantages of the present invention will be understood by those of ordinary skill in the art after referring to the detailed description of the preferred embodiment and drawings herein.

DESCRIPTION OF THE PREFERRED EMBODIMENT INTERCONNECTION

This section defines the structure and interconnection of one embodiment of the present invention in a graphics display terminal. The various signals mentioned in this interconnection section will be defined as they appear and are discussed in the operational section.

Figure 1:
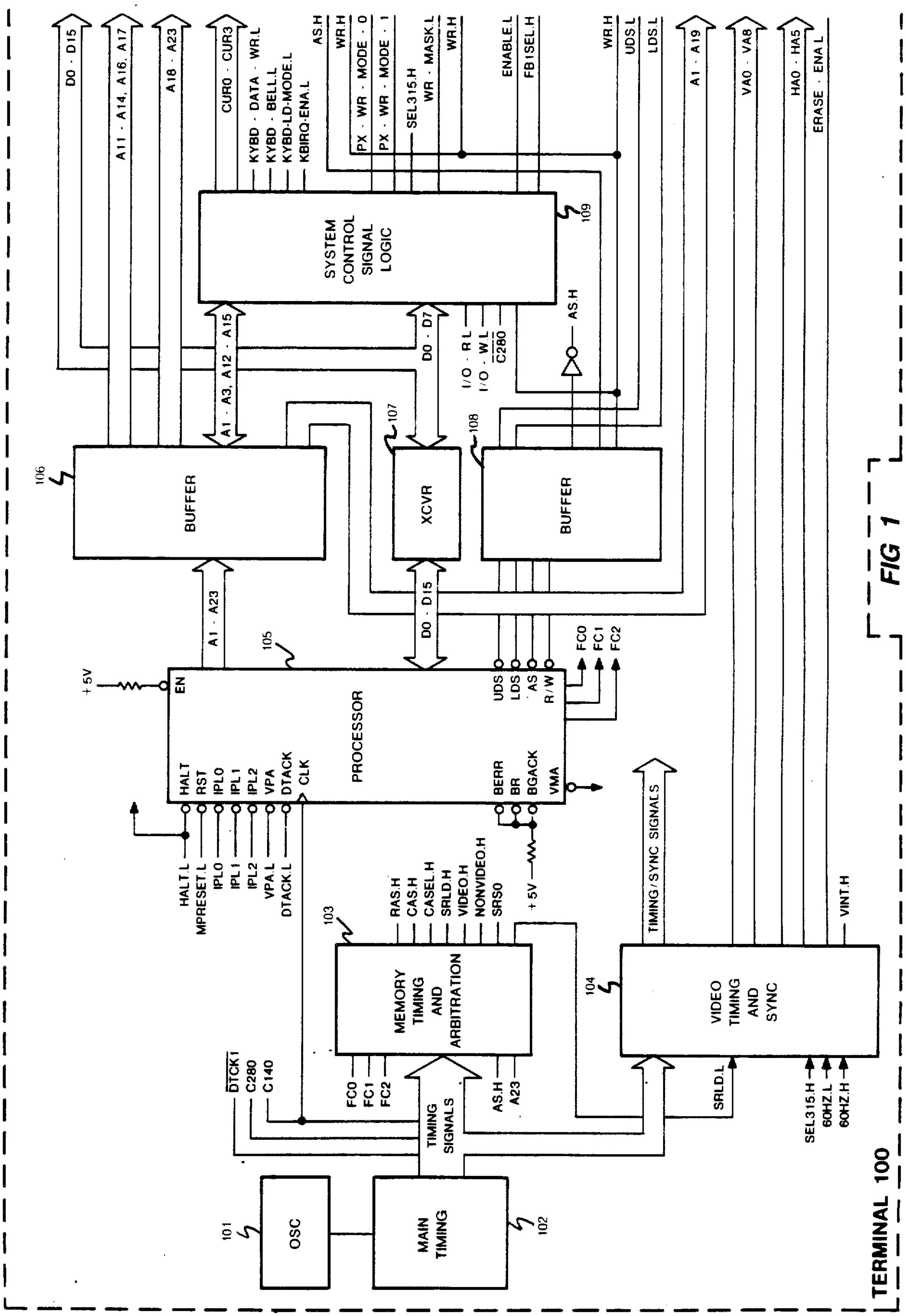
FIGS. 1 and 1A are a block diagram of major elements of a graphics display terminal.
Figure 1A:
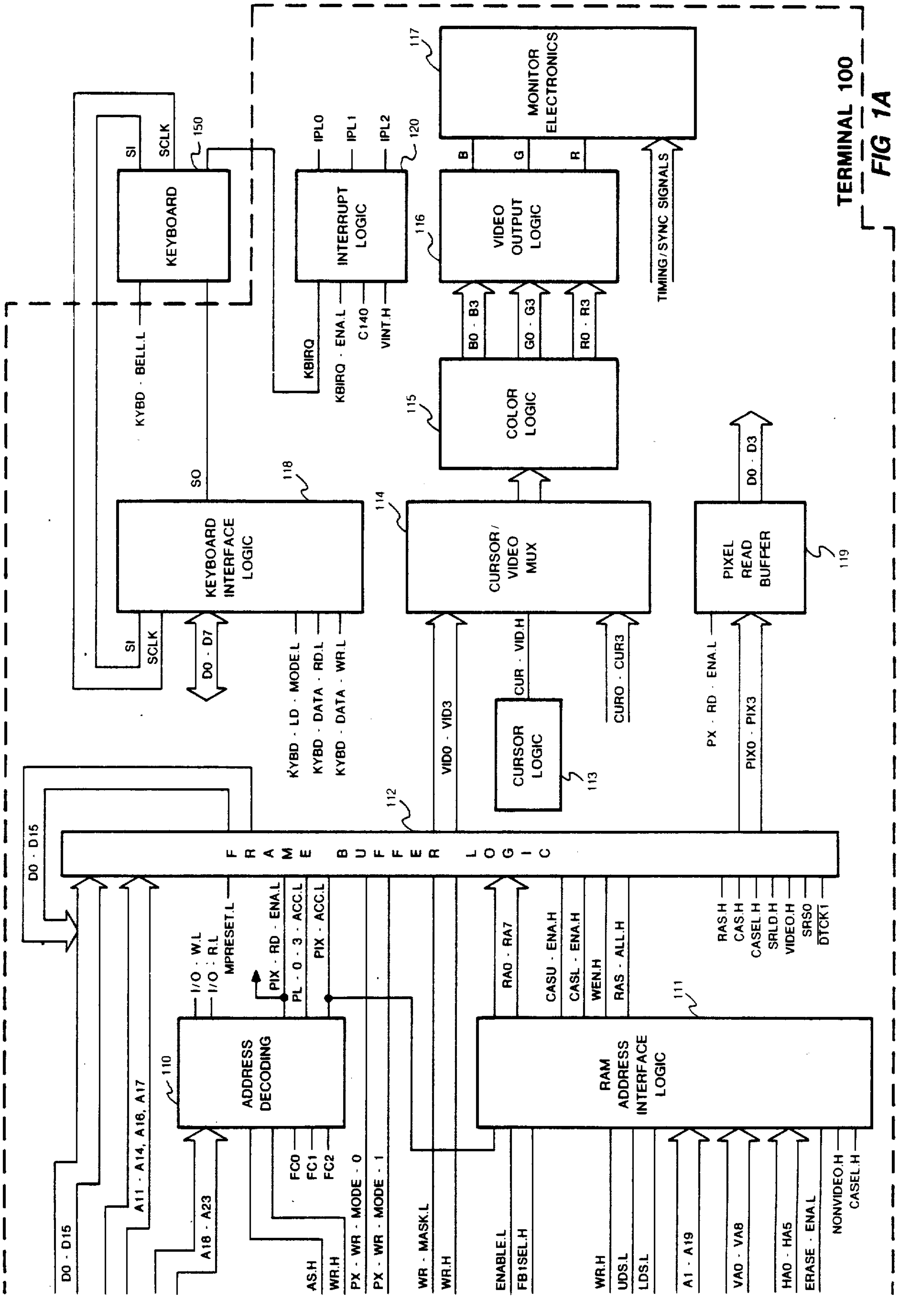

Looking first at FIG. 1 and FIG. 1A, a block diagram of the major components of terminal 100 is shown. Oscillator 101 provides a master clocking signal to main timing 102. Main timing 102 provides several timing signals for use throughout terminal 100. Memory timing and arbitration 103 receives timing signals from main timing 102, FC0–FC2 from processor 105, A23 from buffer 106 and AS.H from buffer 108. Memory timing and arbitration 103 provides several timing signals for the operation of framer buffer logic 112 as described in more detail below. Video timing and sync 104 receives timing signals from main timing 102, SRLD.L from memory timing and arbitration 103, SEL315.H from system control signal logic 109, and 60 HZ.L and 60 HZ.H from user operable switches. Video timing and sync 104 provides timing/sync signals for use by monitor electronics 117, provides vertical and horizontal addresses VA0–VA8 and HA0–HA5 and ERASE–ENA.L to RAM address interface logic 111 and provides VINT.H to interrupt logic 120. The design and operation of video timing and sync 104 is described in detail in copending application Ser. No. 470,699, now U.S. Pat. No. 4,616,260. Processor 105, for example a Motorola MC68000, is clocked every 140 nanoseconds by C140 from main timing 102. Processor 105 receives HALT.L and MPRESET.L signals from reset circuitry, not shown, and interrupts IPL0–IPL2 from interrupt logic 120. Processor 105 can receive or transmit 16 bits of data information D0–D15 from or to transceiver 107. Processor 105 also provides 23 address bits A1–A23 to buffer 106, function code signals FC0–FC2 to address decoding 110 and UDS (upper data strobe), LDS (lower data strobe), AS (address strobe) and R/W (read/write status) to buffer 108. Buffer 106 provides address bit A23 to memory timing and arbitration 103, address bits A11–A14, A16 and A17 to frame buffer logic 112, address bits A18–A23 to address decoding 110, address bits A1–A3 and A12–A15 to system control signal logic 109 and address bits A1–A19 to RAM address interface logic 111. Transceiver 107 provides data bits D0–D15 to frame buffer logic 112 and data bits D0–D7 to system control logic 109. Transceiver 107 also receives data bits D0–D15 from frame buffer logic 112 and data bits D0–D3 from pixel read buffer 119. Buffer 108 provides UDS.L, LDS.L and WR.H to RAM address interface logic 111. Buffer 108 also provides AS.H and WR.H to address decoding 110 and provides AS.H to memory timing and arbitration 103. System control signal logic 109 receives address bits A1–A3 and A12–A15 from buffer 106, data bits D0–D7 from transceiver 107, WR.H from buffer 108, NOT C280 from main timing 102, I/O-R.L and I/O-W.L from address decoding 110. Address decoding 110 receives address bits A18–A23 from buffer 106, AS.H and WR.H from buffer 108, and FC0–FC2 from processor 105. RAM address interface logic 111 receives PIX-ACC.L from address decoding 110; ERASE.L and FB1SEL.H from system control signal logic 109; WR.H, UDS.L and LDS.L from buffer 108; address bits A1–A19 from processor 105; ERASE-ENA.L, VA0–VA8, and HA0–HA5 from video timing and sync 104, and NONVIDEO.H and CASEL.H from memory timing and arbitration 103. Frame buffer logic 112 receives data bits D0–D15 from transceiver 107; address bits A11–A14, A16 and A17 from buffer 106; MPRESET.L from the interrupt logic; PIX-RD-ENA.L, PL-0-3-ACC.L, PL4-7-ACC.L, PL-8-11-ACC.L, PL-12-15-ACC.L and PIX-ACC.L from address decoding 110; WR-MASK.L, PX-WR-MODE-0, PX-WR-MODE-1 from system control signal logic 109; WR.H from buffer 108; address bits RA0–RA7 from RAM address interface logic 111; CASU-ENA.H, CASL-ENA.H, WEN.H, and RAS-ALL.H from RAM address interface logic 111; and RAS.H, CAS.H, CASEL.H, SRLD.H, VIDEO.H, SRS0, and NOTDTCK1 from memory timing and arbitration 103. Cursor/video mux 114 receives video signals VID0–VID3 from frame buffer logic 112, cursor video signals CUR0–CUR3 from system control signal logic 109 and CUR-VID.H from cursor logic 113. Color logic 115 receives the multiplexed cursor and video information from cursor/video mux 114 and provides 4 bits of blue color information B0–B3, 4 bits of green information G0–G3, and 4 bits of red color information R0–R3 to video output logic 116 which provides the blue, green and red video signal to monitor electronics 117. Monitor electronics 117 also receives timing and synchronization signals from video timing and sync 104. Keyboard interface logic 118 receives data bits D0–D7 from transceiver 107; KYBD-LD-MODE.L, KYBD-DATA-RD.L, and KYBD-DATA-WR.L, from system control signal logic 109; and SCLK and SI from keyboard 150. Keyboard 150 receives output data stream S0 from keyboard interface logic 118 and KYBD-BELL.L from system control logic. Pixel read buffer 119 receives PIX0–PIX3 from frame buffer logic 112 and PIX-RD-ENA.L from address decoding 110. The four values of PIX0–PIX3 are provided to XCVR 107 over lines D0–D3. Interrupt logic 120 receives KBIRQ-ENA.L from system control signal logic 109, C140 from main timing 102, KBIRQ from keyboard 150 and VINT.H from video timing and SYNC 104.

This concludes an overview of the interconnection of major components of terminal 100. As will be appreciated by those skilled in the art, various components and functions typically found in video display terminals, such as the asynchronous interface to the host computer or character ROMs, are not shown for clarity and brevity of presentation. These elements are well known in the art and need not be shown here to fully explain the present invention.

Figure 2:
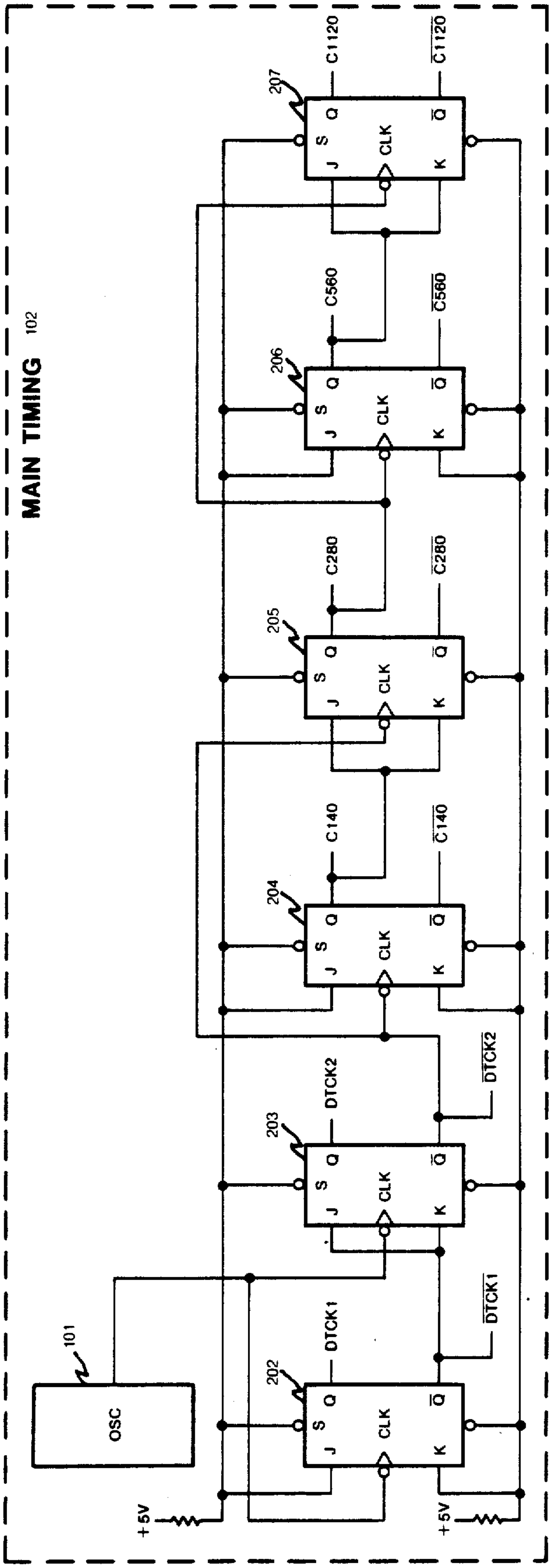
FIG. 2 is a schematic diagram of main timing 102.
Figure 2A:
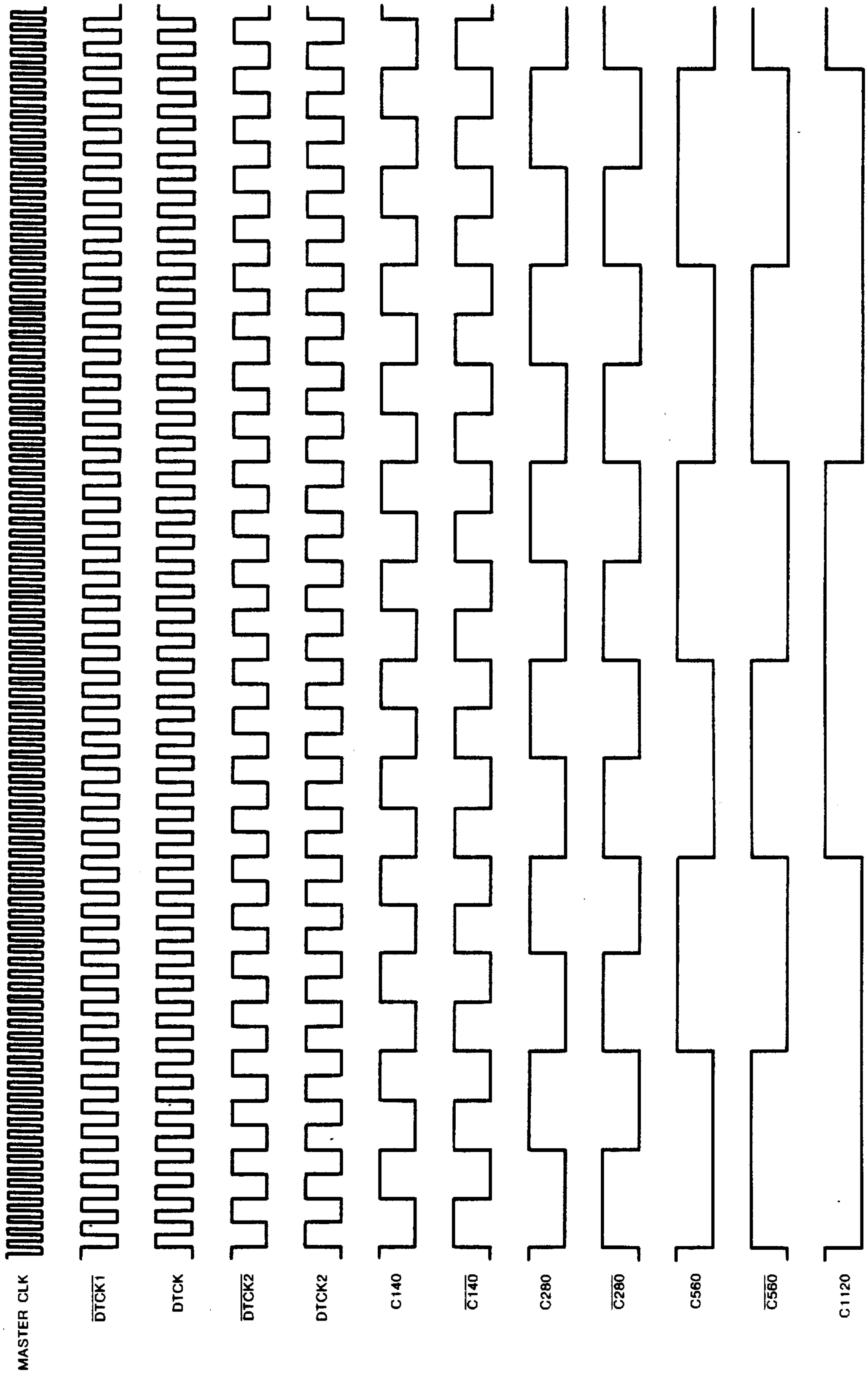
FIG. 2A is a timing diagram illustrating the operation of main timing 102.

Looking now at FIG. 2 a schematic diagram of main timing 102 is shown. Flip flops 202–207 are interconnected such that timing signals having a variety of frequencies are available for terminal use. Oscillator 101 (for example, a Motorola K1100 Series) provides a master clock signal, in this embodiment 57.398 megahertz, to the clocking input of flip flop 202 and 203. The J and K inputs to flip flop 202, 204 and 206 are held high. The NOTQ output of flip flop 202, NOTDTCK1, is provided to the J and K inputs of flip flop 203. The NOTQ output of flip flop 203, NOTDTCK2, is provided as a clocking signal to flip flops 204 and 205. The J and K inputs of flip flop 204 are held high. The Q output of flip flop 204, C140, is provided to the J and K inputs of flip flop 205. The Q output of flip flop 205, C280, is provided as a clocking signal to flip flops 206 and 207. The Q output of flip flop 206, C560, is provided to the J and K inputs of flip flop 207. The S and R inputs of flip flops 202–207 are all held high. For ease of understanding, some timing signal names indicate their approximate period. For example, C140 has a period of approximately 140 nanoseconds, C280 has a period of approximately 280 nanoseconds, and so forth. FIG. 2A illustrates the relationship between the various timing signals generated by oscillator 101 and flip flops 202–207. These timing signals are provided to various locations in terminal 100.

Figure 3:
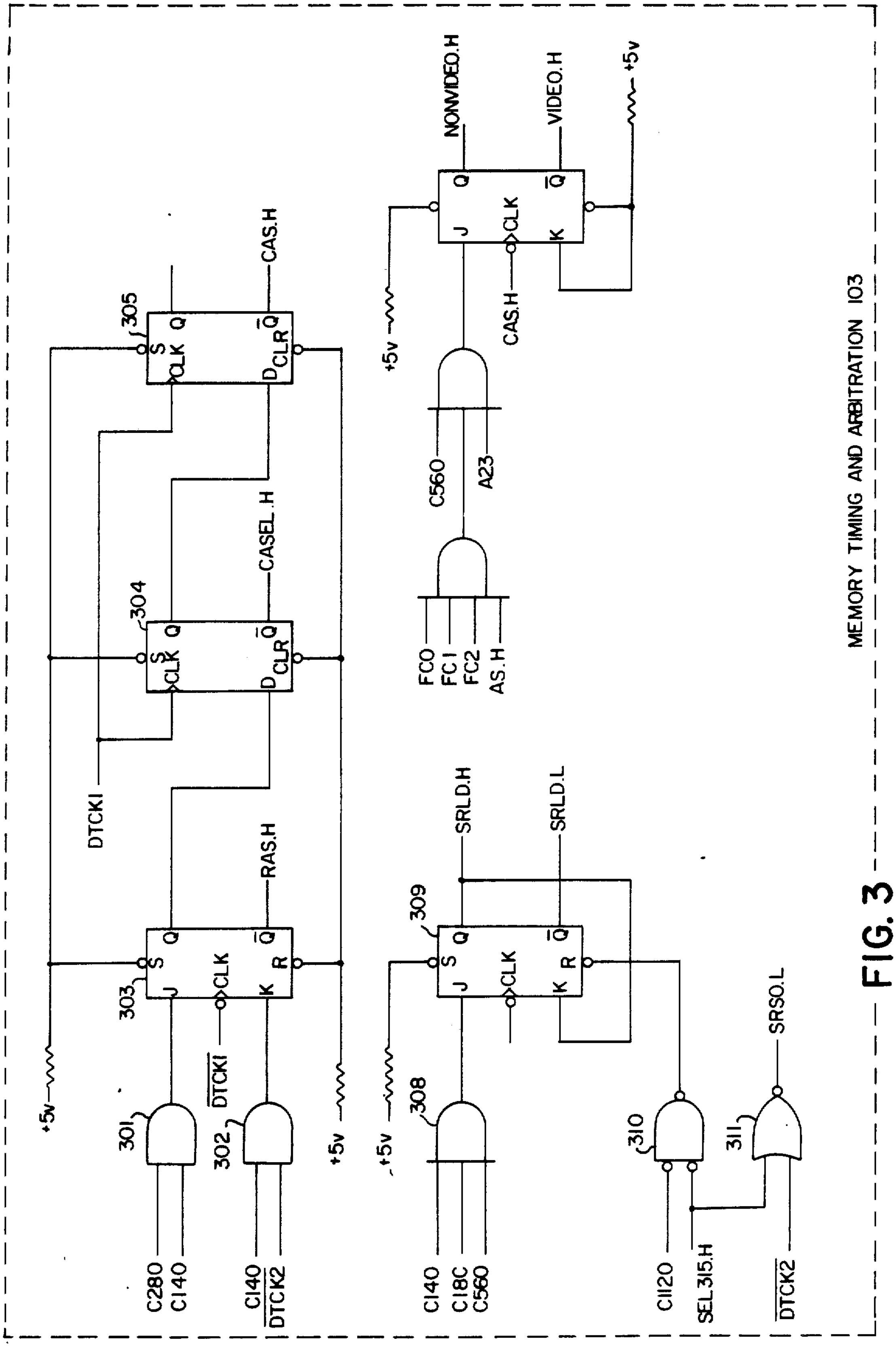
FIG. 3 is a schematic diagram of memory timing and arbitration 103.

Turning now to FIG. 3 a schematic diagram of memory timing and arbitration 103 is shown. AND gate 301 receives clocking signals C280 and C140 from main timing 102. The output of AND gate is provided to the J input of flip flop 303. AND gate 302 receives clocking signals NOTC140 and NOTDTCK2 from main timing 102. The output of AND gate 302 is provided to the K input of flip flop 303, which is clocked by clocking signal NOTDTCK1 from main timing 102. The Q output of flip flop 303 is provided to the D input of flip flop of 304. The NOT Q output of flip flop 303 is row address strobe signal RAS.H. Flip flops 304 and 305 are clocked by DTCK1 from main timing 102. The Q output of flip flop 304 is provided to the D input of flip flop 305 the NOT Q output of flip flop 304 is signal CASEL.H. The NOT Q output of flip flop 305 is column address strobe signal CAS.H. The set and reset inputs of flip flop 303 and the set and clear inputs of flip flops 304 and 305 are held high. AND gate 308 receives clocking signals C140, C280 and C560 from main timing 102. The output of AND gate 308 is provided to the J input of flip flop 309 which is clocked by signal NOTDTCK1 from main timing 102. The Q output of flip flop 309 is signal SRLD.H and is returned to the K input of flip flop 309. The NOT Q output of flip flop 309 is SRLD.L. The set input of flip flop is held high while the reset input is connected to the output of NAND gate 310. NAND gate 310 receives clocking signal C1120 from main timing 102 and SEL315.H from system control signal logic 109. The SEL315.H is also provided to the input of NOR gate 311 along with clocking signal NOTDTCK2 from main timing 102. The output of NOR gate 311 is signal SRS0.L. AND gate 312 receives address strobe AS.H from buffer 108 and function code signals FC0–FC2 from processor 105. The output of AND gate 312 is provided to AND gate 313 along with C560 from main timing 102 and A23 from processor 105. The output of AND gate 313 is provided to the J input of flip flop 314 which is clocked by strobe signal CAS.H. The Q output of flip flop 314 is NONVIDEO.H and the NOTQ output is VIDEO.H. The set, reset and K inputs to flip flop 314 are held high.

Figure 4:
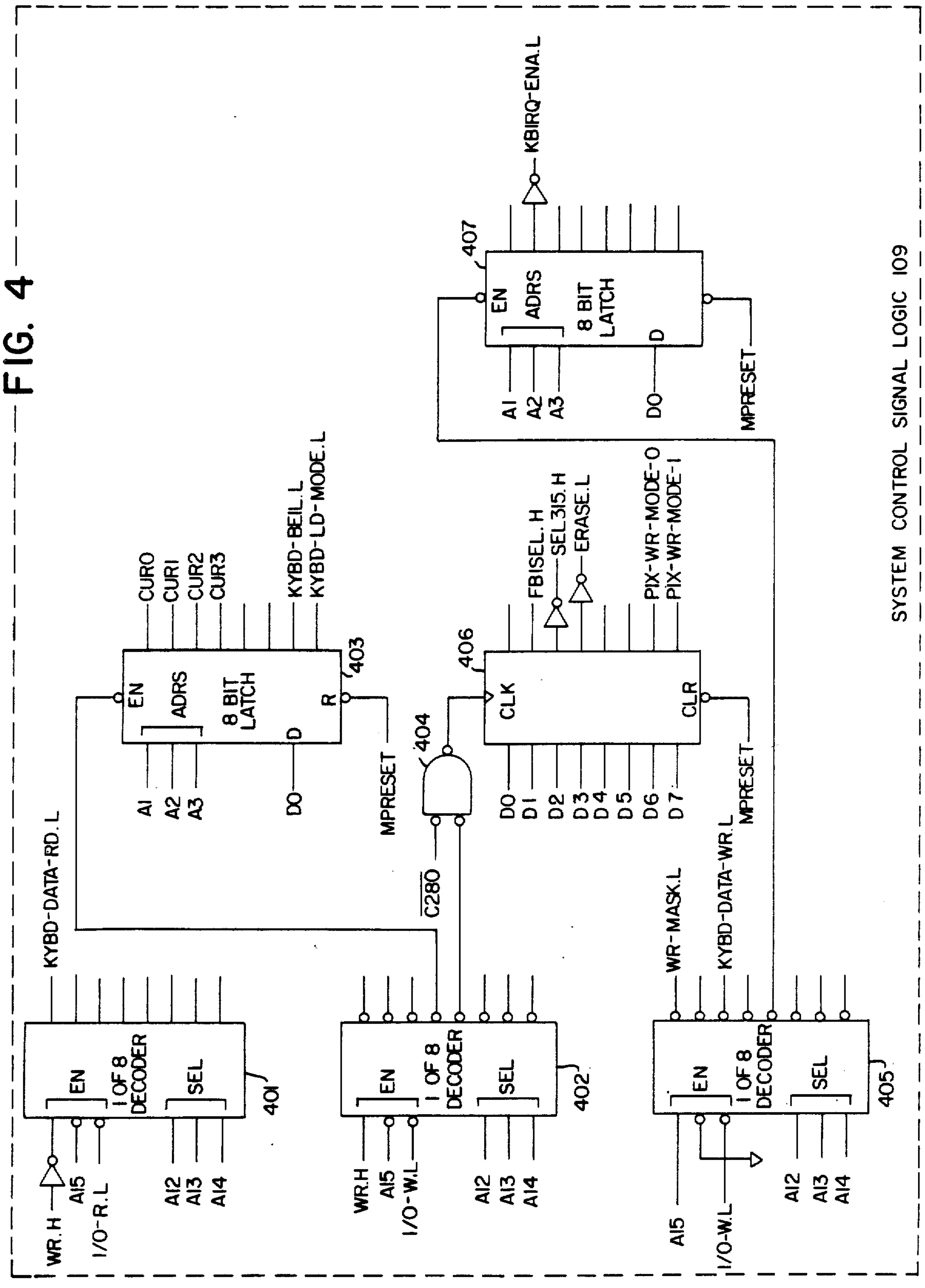
FIG. 4 is a schematic diagram of system control signal logic 109.

Looking now at FIG. 4, a schematic diagram of system control signal logic 109 is presented. As will be appreciated by one skilled in the art, system control signal logic 109 may be used to provide many signals for control of the terminal system. For clarity of presentation only those signals relevant to the invention disclosed herein are shown. One-of-eight decoder 401 receives selecting inputs A12–A14 and enabling inputs A15, I/O-R.L and the inverse of WR.H. Decoder 401 provides KYBD-DATA-RD.L to keyboard interface logic 118. One-of-eight decoder 402 receives selecting inputs A12–A14 and enabling inputs WR.H, A15 and I/O-W.L. Decoder 402 provides the enabling input for eight bit latch 403 and one of the inputs to NAND gate 404. Eight bit latch 403 receives address inputs A1–A3 and data input D0. Latch 403 provides cursor information CUR0–CUR3 to cursor/video mux 114, KYBD-BELL.L to keyboard 150 and KYBD-LD-MODE.L to keyboard interface logic 118. NAND gate 404 also receives NOTC280 from main timing 102. The output of NAND gate 404 is used to clock latch 406 which receives D0–D7 from transceiver 107. Latch 406 provides FBISEL.H, the inverse of SEL315.H, the inverse of ERASE.L, PIX-WR-MODE-0 and PIX-WR-MODE-1. One-of-eight decoder 405 receives A12–A14 as selecting inputs and A15 and I/O-W.L as enabling inputs. The third enabling input to decoder 405 is held low. Decoder 405 provides WR-MASK.L, KYBD-DATA-WR.L and the enabling input of 8 bit latch 407. Latch 407 receives A1–A3 as address inputs and D0 as a data input. Latch 407 provides the inverse of KBIRQ-ENA.L. The reset inputs of 8 bit latches of 403 and 407 and the clear input of latch 406 are connected to MPRESET.

Figure 5:
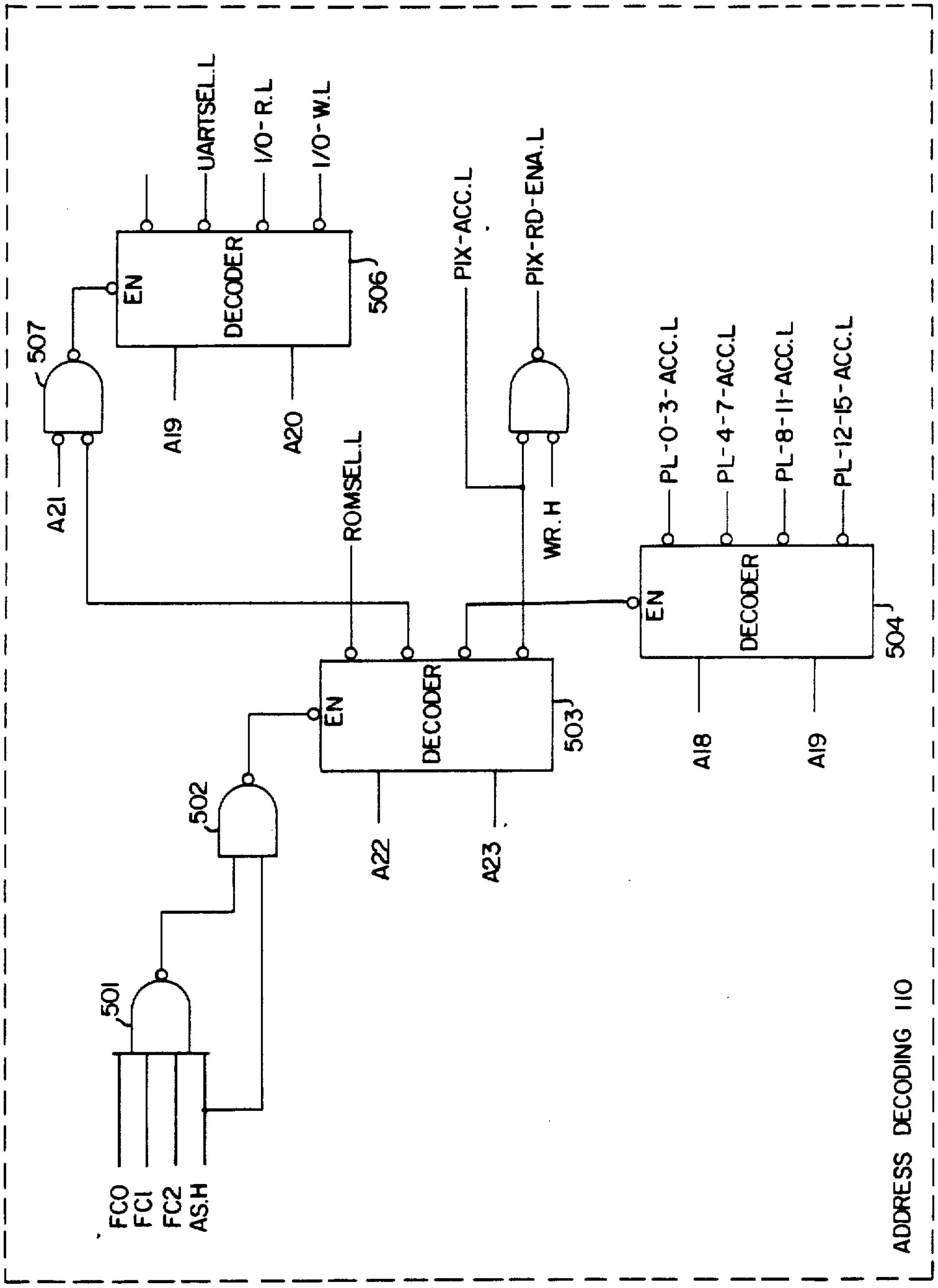
FIG. 5 is a schematic diagram of address decoding 110.

Looking now at FIG. 5 a schematic diagram of address decoding 110 is presented. NAND gate 501 receives FC0–FC2 and AS.H from processor 105. The output of gate 501 and AS.H are provided to NAND gate 502, the output of which is provided as an enabling input to decoder 503. Decoder 503 receives A22 and A23 and decodes them to provide ROMSEL.L (ROM select), one of the inputs to NAND gate 507, the enabling input to decoder 504 and PIX-ACC.L. NAND gate 507 receives A21 as its other input and is connected as the enabling input of decoder 506. Decoder 506 decodes A19 and A20 to provide UARTSEL.L, I/O-R.L and I/O-W.L. NAND gate 505 receives PIX-ACC.L from decoder 503 and WR.H from buffer 108. The output of NAND gate 505 is PIX-RD-ENA.L and is provided to pixel read buffer 119 and frame buffer logic 112. Decoder 504 decodes A19 and A18 to provide PL-0-3.ACC.L, PL-4-7-ACC.L, PL-8-11-ACC.L, and PL-12-15-ACC.L.

Figure 6:
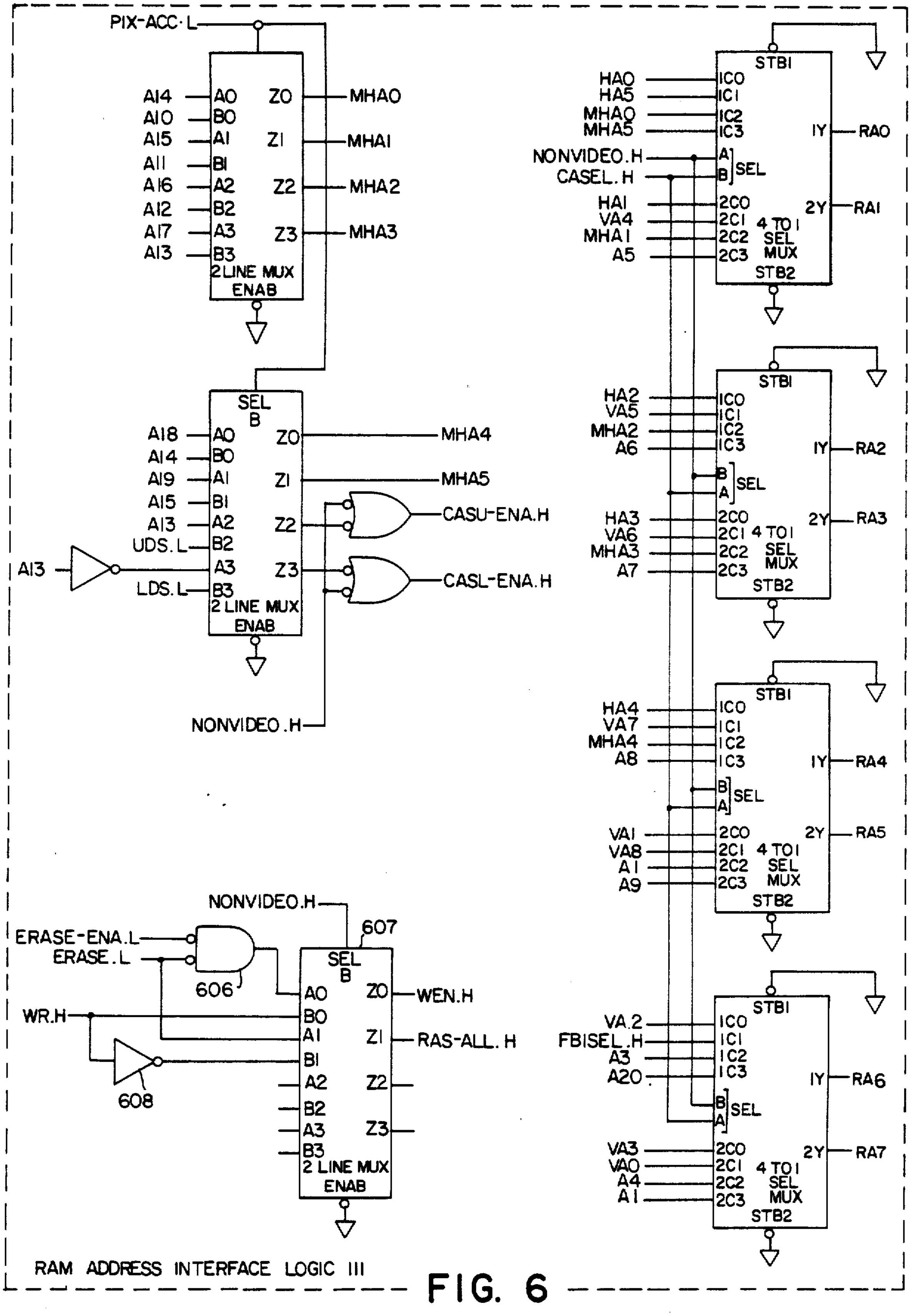
FIG. 6 is a schematic diagram of RAM address interface logic 111.

FIG. 6 shows a schematic diagram of RAM address interface logic 111. Address bits A14–A17 are provided to the A inputs and A10–A13 are provided to the B inputs of two-line multiplexer 601. Address bits A18, A19, A13 and the inverse of A13 are provided to the A inputs of two line multiplexer 602. Address bits A14, A15 along with UDS.L and LDS.L are provided to the B inputs of multiplexer 602. Selection between the A inputs and B inputs of multiplexers 601 and 602 is controlled by PIX-ACC.L. The four outputs of multiplexer 601, MHA0–MHA3, and two of the outputs of multiplexer 602, MHA4 and MHA5, are provided to four-to-one multiplexers 609–612. Either A13 or UDS.L, as selected by PIX-ACC.L, is provided to one input of NOR gate 604. Similarly, either the inverse of A13 or LDS.L, as selected by PIX-ACC.L, is provided as one input of NOR gate 605. The other input of NOR gate 604 and 605 is connected to NONVIDEO.H. The outputs of NOR gate 604 and NOR gate 605 are provided to frame buffer logic 112.

The A0 input of two line multiplexer 607 is connected to the output of NAND gate 606. NAND gate 606 receives ERASE.L and ERASE-ENA.L as inputs. The A1 input of multiplexer 607 is connected to ERASE.L. The B0 input of multiplexer 607 is connected to WR.H while the B1 input is connected to the inverse of WR.H. Selection between the A and B inputs of multiplexer 607 is controlled by NONVIDEO.H. Either the output of gate 606 or WR.H is selected to be provided as write enable signal WEN.H. Either ERASE.L or the inverse of WR.H is selected to be provided as RAS-ALL.H.

Looking now at four-to-one multiplexer 609–612 each multiplexer receives four inputs 1C0–1C3 and four inputs 2C0–2C3. One of each set of inputs is selected to be provided as outputs 1Y and 2Y, selection between the inputs being controlled by selecting inputs A and B. All four multiplexers are provided with NONVIDEO.H and CASEL.H as the selection inputs. Multiplexer 609 receives HA0, HA5, MHA0 and MHA5 as inputs 1C0–1C3 respectively and HA1, VA4, MHA1 and A5 as inputs 2C0–2C3 respectively. Multiplexer 610 receives HA2, VA5, MHA2 and A6 as inputs 1C0–1C3 respectively and HA3, VA6, MHA3 and A7 as inputs 2C0–2C3 respectively. Multiplexer 611 receives HA4, VA7, MHA4 and A8 as inputs 1C0–1C3 respectively, and VA1, VA8, A2 and A9 as inputs 2C0–2C3 respectively. Finally, multiplexer 612 receives VA2, FB1SEL.H, A3 and A20 as inputs 1C0–1C3 respectively and VA3, VA0, A4 and A1 as inputs 2C0–2C3 respectively. The outputs of multiplexer 609–612 comprise the 8 address bits RA0–RA7 to be provided to frame buffer logic 112.

Figure 7A:
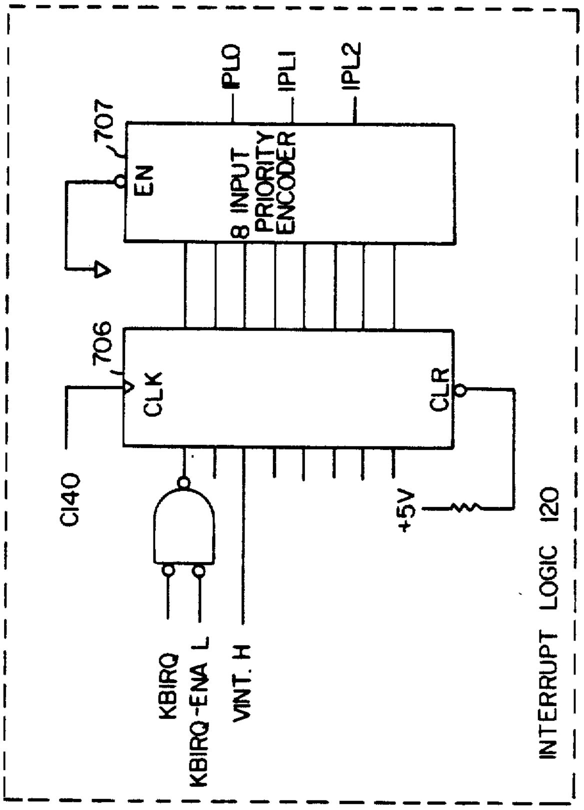
FIG. 7A is a schematic diagram of interrupt logic 120.
Figure 7:
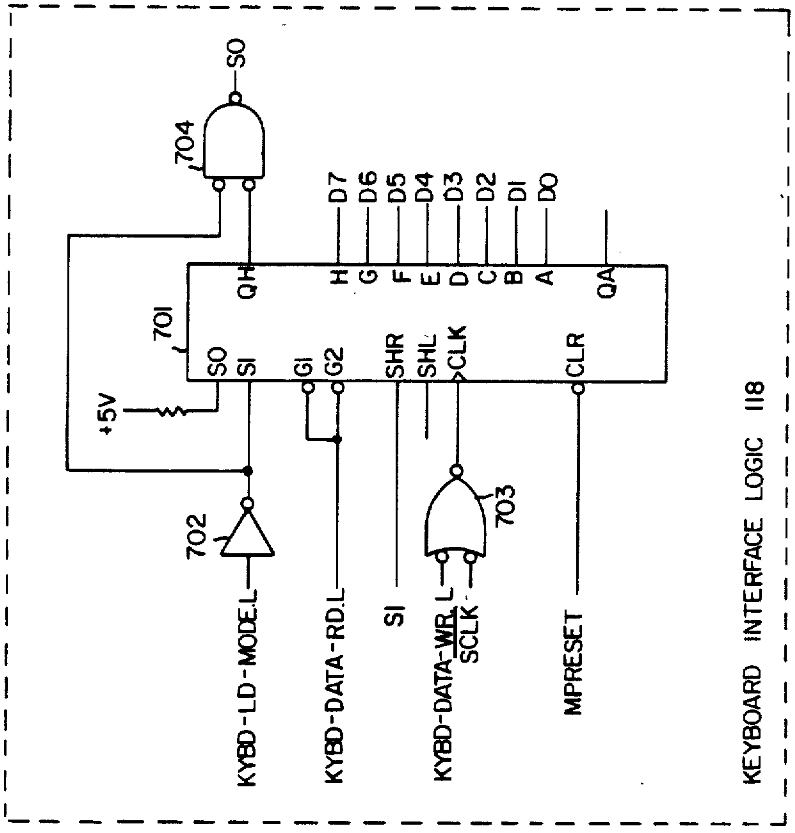
FIG. 7 is a schematic diagram of keyboard interface logic 118.

Looking now at FIG. 7, the schematic diagram of keyboard interface logic 118 is presented. Shift register 701 receives a serial data stream from keyboard 150 over serial input line SI. The SO input to register 701 is held high, the S1 input is connected to the inverse of KYBD-LD-MODE.L, inputs G1 and G2 are connected to KYBD-DATA-RD.L, the CLR input is connected to MPRESET, and the CLK input is connected to the output of NOR gate 703. NOR gate 703 receives as inputs KYBD-DATA-WR.L from system control signal logic IOS and NOT SCLK from terminal 150. Shift register 701 receives data from and makes data available to processor 105 on data lines D0–D7. NAND gate 704 receives the output of shift register 701 from QH and the inverted KYBD-LD-MODE.L. The output of NAND gate 704 is a serial data stream S0 provided to terminal 150.

As explained in more detail in copending application Ser. No. 470,697, keyboard 150 notifies terminal 100 when data is available to terminal 100 by sending interrupt signal NOTKBIRQ. Referring to FIG. 7A, NOT KBIRQ is provided to one input of NAND gate 705. The other input to NAND gate 705 is KBIRQ ENA.L from system control logic 109. The output of NAND gate 705 is provided to latch 706 which is clocked by timing signal C140. Latch 706 also receives the vertical interrupt signal VINT.H from vertical timing and sync 104. The outputs of latch 706 are provided to 8 input priority encoder 704 which provides three interrupt signals IPL0–IPL2 to processor 105. As will be understood by those skilled in the art many various conditions may cause computer interrupts to be generated. The other inputs to latch 706 can be used for this purpose.

Figure 8:
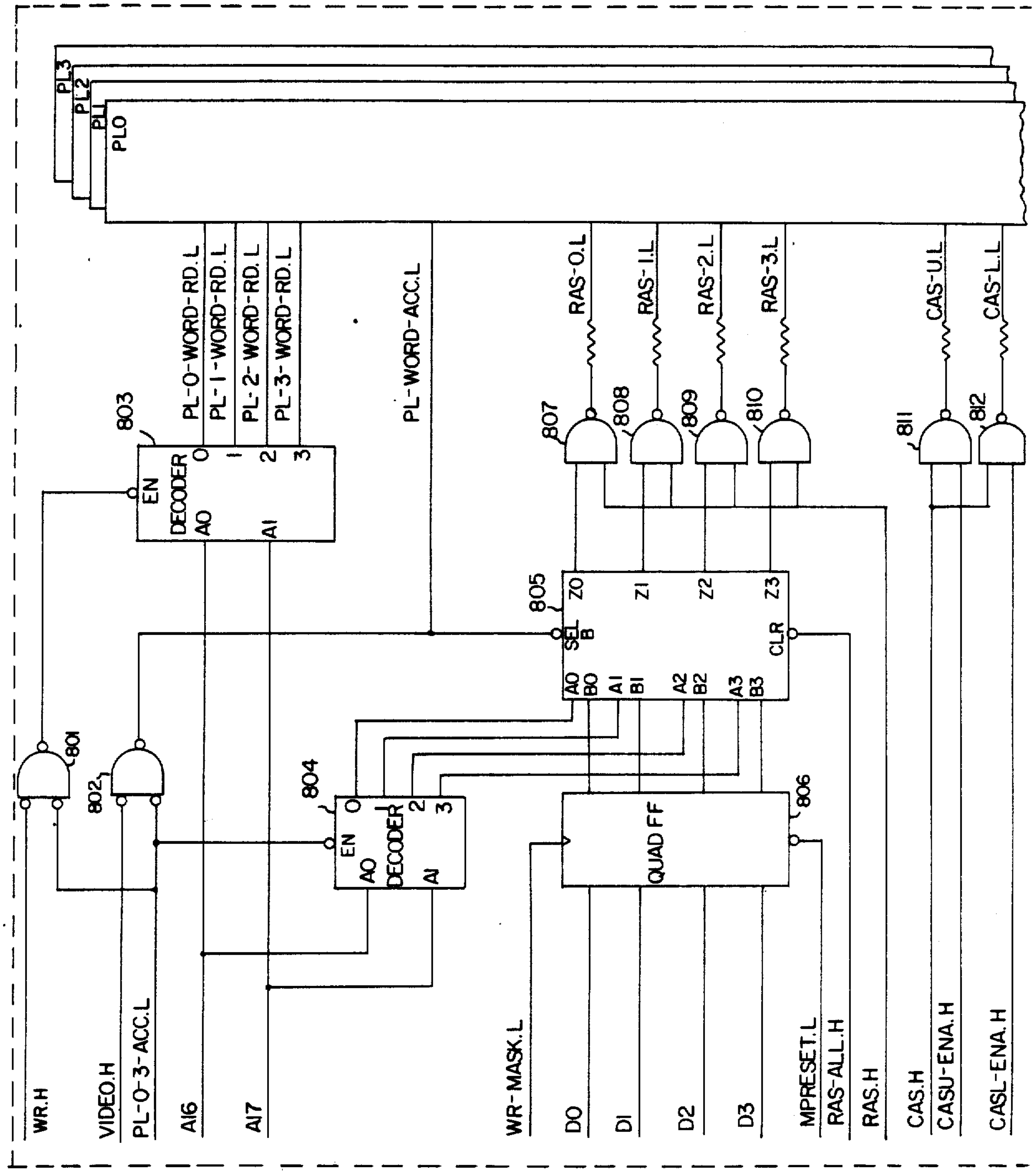
FIGS. 8 and 8A are a schematic diagram of frame buffer logic 112.
Figure 8A:
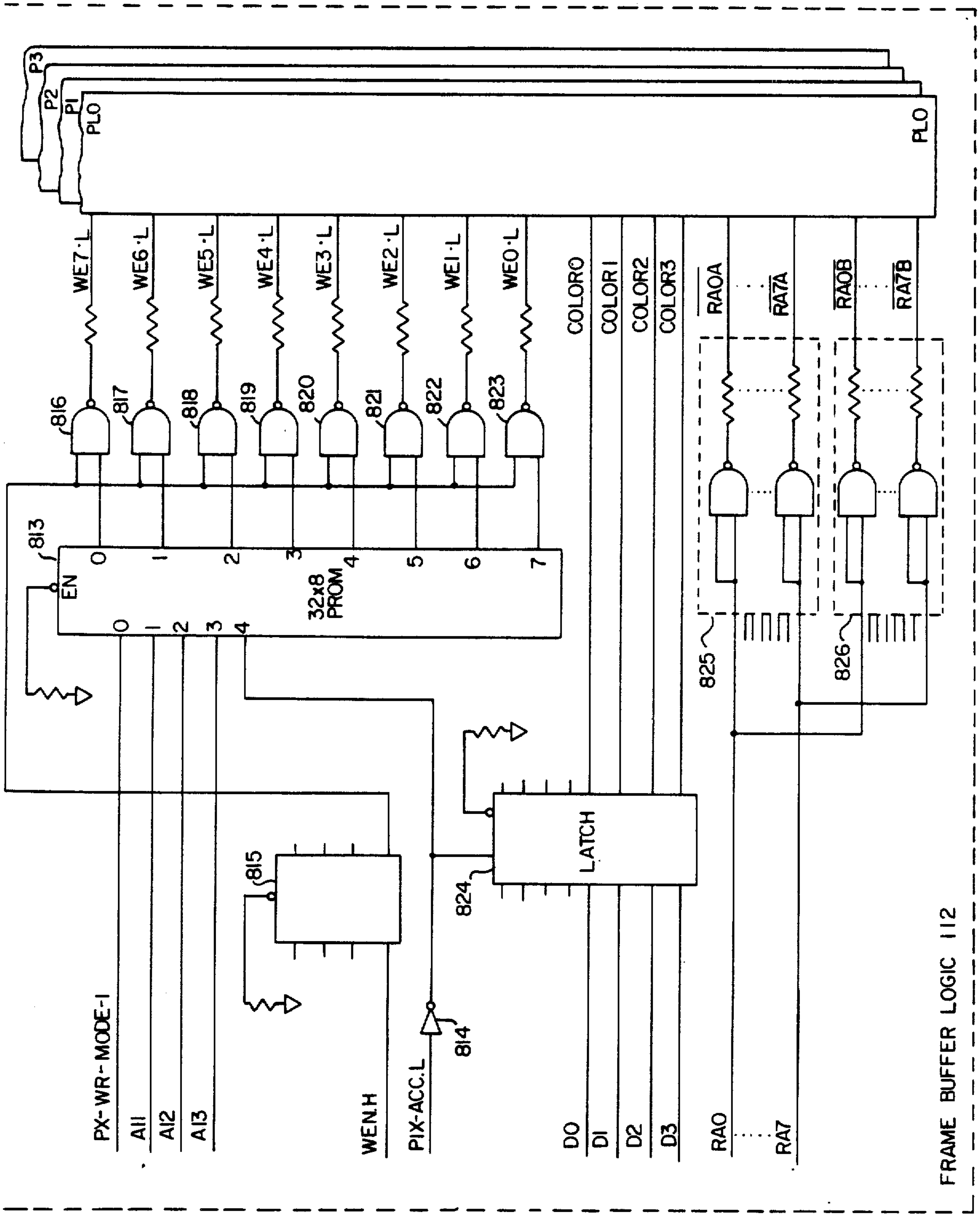

Looking now at FIG. 8 and FIG. 8*a* together a schematic diagram of frame buffer logic 112 is presented. NAND gate 801 receives WR.H from buffer 108 and PL-0-3-ACC.L from address decoding 110. The output of gate 801 is provided as the enabling input of decoder 803. Decoder 803 receives A16 and A17 and provides four outputs PL-0-WORD-RD.L, PL-1-WORD-RD.L, PL-2-WORD-RD.L, and PL-3-WORD-RD.L to planes PL0–PL3 respectively. NAND gate 802 receives VIDEO.H from memory timing and arbitration 103 and PL-0-3-ACC.L from address decoding 110. The output of NAND gate 802 is provided as PL-WORD-ACC.L to planes PL0–PL3 and is provided as the selecting input of 2 line multiplexer 805. PL-0-3-ACC.L is also supplied as the enabling input of decoder 804. Decoder 804 also receives A16 and A17 and provides 4 outputs to the A0–A3 inputs of multiplexer 805. Data bits D0–D3 are provided from transceiver 107 to quad flip flop 806, which is clocked by WR-MASK.L from system control signal logic 109. The outputs of flip flop 806 are provided to the inputs B0–B3 of multiplexer 805. The clear input of flip flop 806 is connected to MPRESET.L and the clear input of multiplexer 805 is connected to RAS-ALL.H from RAM address interface logic 111. Selected outputs of multiplexer 805 are provided to NAND gates 807–810 respectively. RAS.H from memory timing and arbitration logic 103 is provided to the other input of NAND gate 807–810. The outputs of NAND gates 807–810 , RAS-0.L, RAS-1.L, RAS-2.L, and RAS-3.L, are each provided through a resistor to one of the planes PL0–PL3. NAND gate 811 receives CAS.H from memory timing and arbitration 103 and CASU-ENA.H from address interface logic 111. The output of NAND gate 811 is provided to memory planes PL0–PL3 as CAS-U.L. NAND gate 812 receives CAS.H and CASL-ENA.H. The output of NAND gate 812 is provided through a resistor to planes PL0–PL3 as CAS-L.L.

32 by 8-bit PROM 813 receives PX-WR-MODE-1 from system control signal logic 109, address bits A11–A13 from buffer 106 and the inverse of PIX-ACC.L from inverter 814. The 8 outputs of PROM A13 are provided to NAND gates 816–823. WEN.H from RAM address interface logic 111 is provided through latch 815 to the other input of NAND gates 816–823. The outputs of gates 816–823 are provided to planes PL0–PL3 as write enabling inputs WE0.L-WE7.L. Data bits D0–D3 are provided to latch 824 and are clocked by PIX-ACC.L. The output of latch 824, COLOR0–COLOR3 are provided to the corresponding plane PL0–PL3 respectively. Memory address bits RA0–RA7 from RAM address interface logic 111 are provided to current driver sets 825 and 826. The outputs of current driver set 825, NOTRA0A–NOTRA7A, are provided to planes PL0 and PL1. The outputs of current drive set 826, NOTRA0B–NOTRA7B, are provided to planes PL2–PL3.

Figure 9:
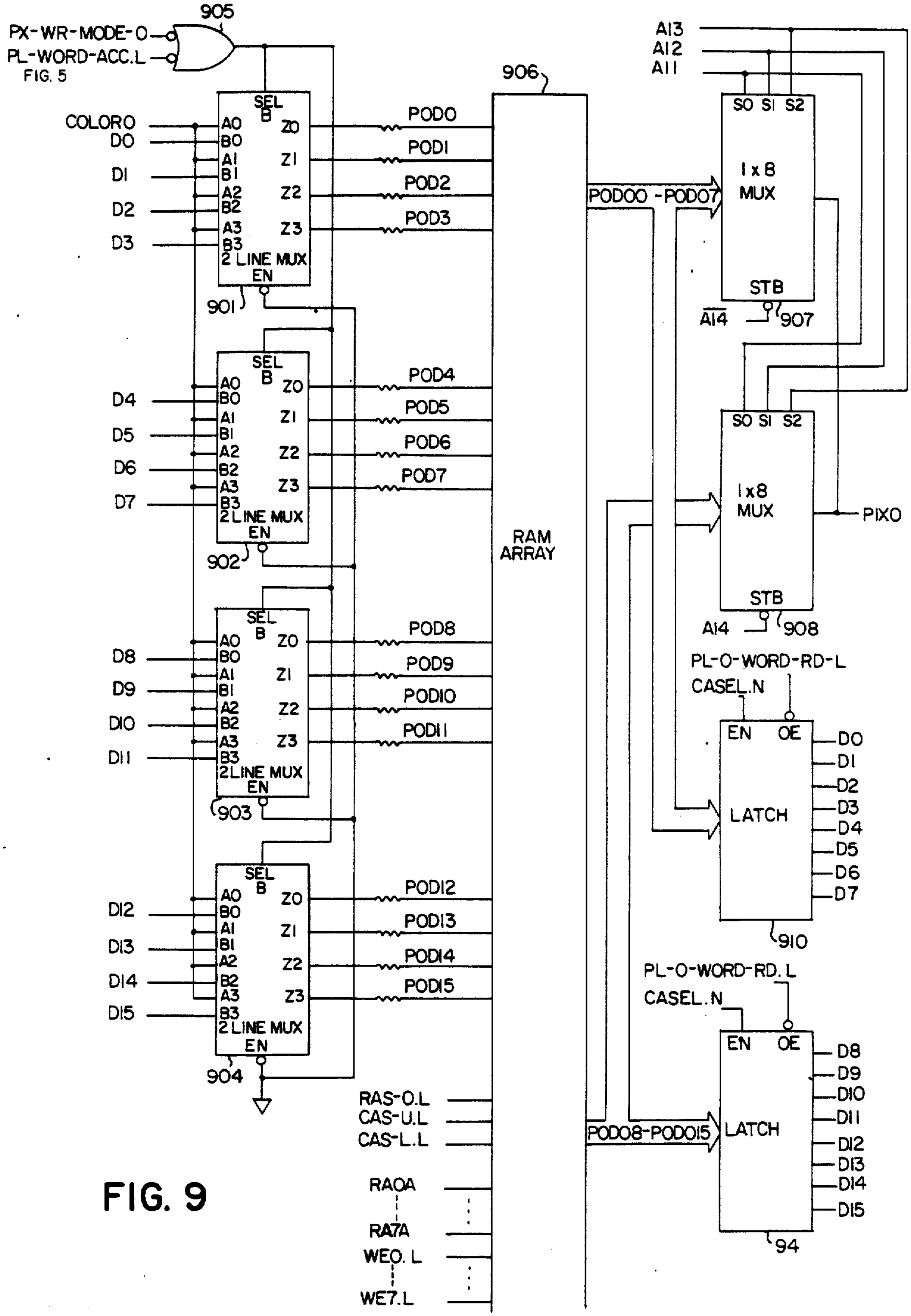
FIGS. 9 and 9A are a schematic diagram of memory plane logic PL0.
Figure 9A:
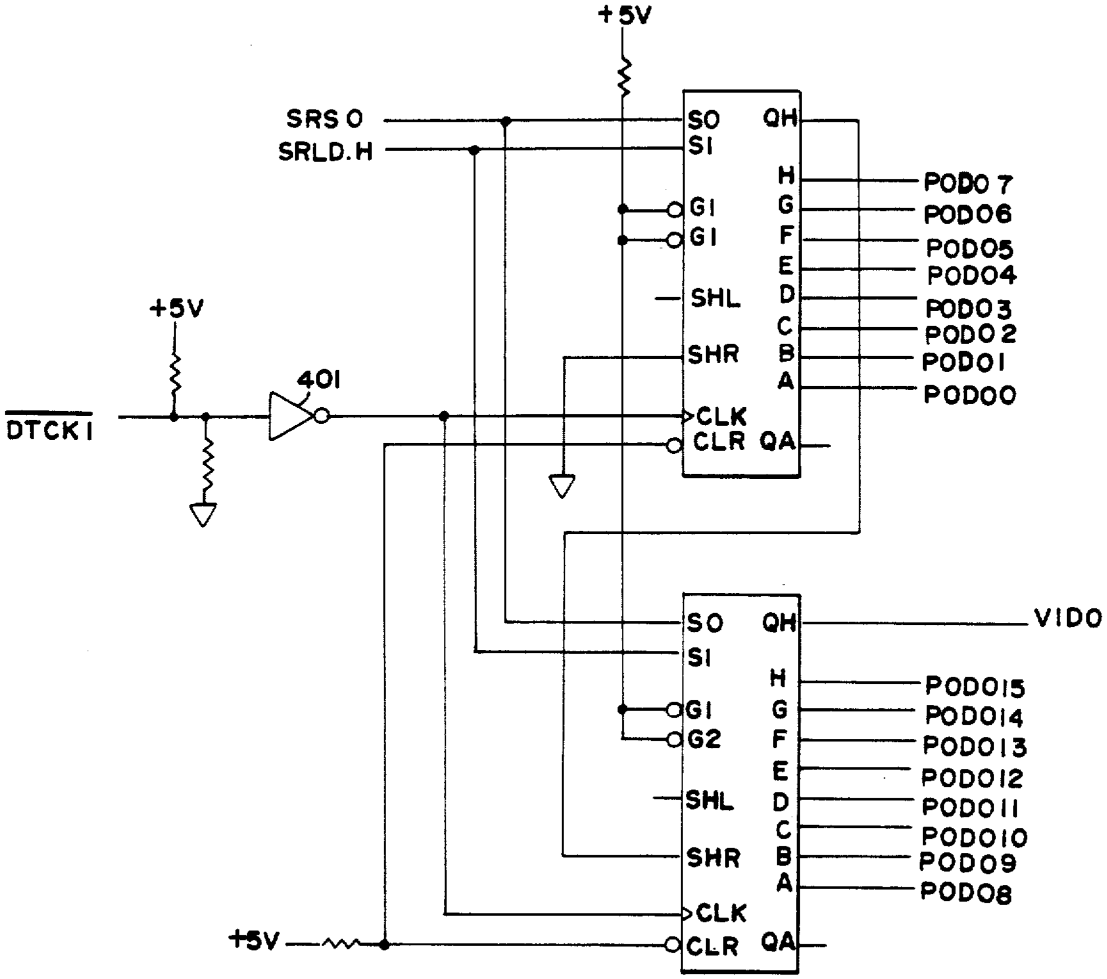

The particular embodiment of terminal 100 described herein has four substantially identical memory planes PL0–PL3. FIGS. 9 and 9A show a schematic diagram of one of these planes, PL0. The other planes operate and are constructed in a similar fashion and vary only in the particular signals that are provided thereto. Looking now at FIG. 9 four two-line multiplexers 901–904 are shown. COLOR0 is provided to the A inputs of all four multiplexers. The B inputs of multiplexer 901 are connected to data bits D0–D3, the B inputs of multiplexer 902 are connected to data bits D4–D7, the B inputs of multiplexer 903 are connected to bits D8–D11 and, finally, the B inputs of multiplexer 904 are connected to D12–D15. PX-WR-MODE-0 and PL-WORD-ACC.L are provided as the inputs to NOR gate 905. The output of gate 905 is provided as the selecting input to multiplexers 901–904. The outputs of multiplexer 901–904, P0D0–P0D15, are provided as data inputs to RAM 906. Outputs P0D00–P0D08 of RAM 906, are provided to multiplexer 907, shift register 912 and latch 910. Outputs P0D08–P0D15 are provided to multiplexer 908, shift register 913 and latch 911. Selecting inputs of multiplexers 907–908 are connected to address bits A11–A13. Multiplexer 907 is enabled by the inverse of A14 while multiplexer 908 is enabled by A14. The output of multiplexer 907 or 908, PIX0, is provided to pixel read buffer 119. Latches 910 and 911 are latched by CASEL.H and receive PL-0-WORD-RD.L as a enabling input. The outputs of latch 910 and 911, D0–D15, are provided to transceiver 107.

RAM 906 outputs P0D00–P0D15 are also provided to shift registers 912–913. The S0 input of registers 912 and 913 is connected to timing signal SRS0 and the S1 inputs of 912 and 913 are connected to timing signal SRLD.H. The G1, G2, and clear inputs of registers 912 and 913 are held high. 912 and 913 are clocked by DTCK1. The output of register 912 is connected to the SHR input of register 913. The output of shift register 913, VID0, is provided to cursor/video mux 114.

Figure 10:
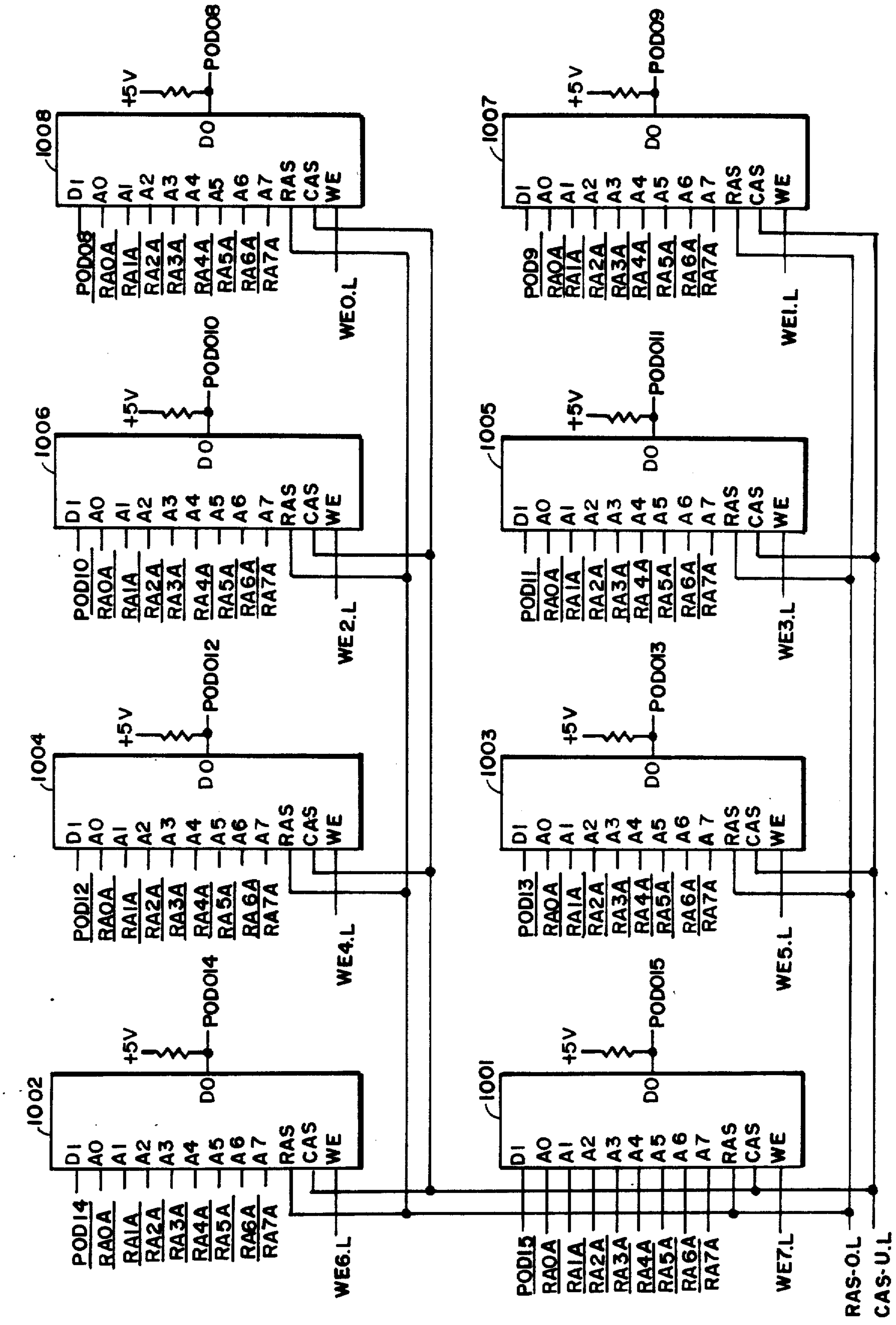
FIGS. 10 and 10A is a schematic diagram of RAM 906.

Finally, looking at FIG. 10, a schematic diagram of RAM 906 is shown. RAM 906 is constructed in this embodiment of 16 64K by 1-bit RAM's 1001-1006. Each of RAM's 1001-1016 is provided with one of the outputs P0D0-P0D15 from multiplexers 901-904. Each RAM also receives the 8 RAM address bits NOTRA0A-NOTRA7A from RAM address interface 111 and row address strobe signal RAS-O.L. RAM's 1001-1008 receive CAS-U.L as the column address strobe signal while RAM's 1009-1016 receive CAS L.L as the column address strobe signal.

Operation

Referring to FIG. 1, a brief overview of terminal 100 operation will be given. As mentioned above, this application addresses features of the apparatus for accessing and controlling terminal memory in frame buffer logic 112. Many terminal operations and signals which are well known in the art and not related to memory access are omitted or discussed only briefly.

The operation of terminal 100 is generally under the supervision and control of processor 105 by means of address lines A1-A23, bidirectional data lines D0-D15 and other discrete output lines discussed in more detail below. Timing signals for all terminal 100 operations are generated by main timing 102 and distributed throughout the system. Memory timing and arbitration 103 generates the particular timing signals required for proper operation of frame buffer logic 112. Video timing and sync 104, based on the scan mode of the terminal, the external power available and certain timing signals from main timing 102 and memory timing and artibtration 103 generates 6 bits of information indicating the horizontal location of the electron beams and 9 bits of information indicating the vertical position of the beams. In addition, vertical timing and sync 104 provides a vertical interrupt signal VINT.H to interrupt logic 120 and various timing and synchronizing signals required by monitor electronics 117 (e.g. composite sync, horizontal sync, vertical sync and composite blank signals). The design and operation of vertical timing and sync 104 is described in detail in copending application Ser. No. 470,699.

Frame buffer logic 112 receives data and address information from processor 105, enabling and control inputs from address decoding 110 and system control signal logic 109, RAM address and control information from RAM address interface logic 111, and timing signals from memory timing and arbitration 103. Based on these signals, data or instructions will either be retrieved from or stored in the proper locations in the frame buffer logic 112 RAM memory. Information to be returned to processor 105 is provided over data lines D0-D15. The 4 bits of information for the pixel to be displayed is provided at the pixel rate over lines VID0-VID3, one bit from each of the four planes. Cursor/video multiplexer 114 receives the video information and, at the appropriate horizontal and vertical positions, integrates the cursor display information with the video data stream. The pixel information is then provided to color logic 115 where the four bits of pixel information are used to select one of 16 colors for display. Color logic 115 outputs four bits of blue, four bits of green and four bits of red information to video output logic 116 where the blue, green and red analog signals are generated for use by monitor electronics 117. Pixel information PIX0-PIX3 is passed through pixel read buffer 119 and made available to XCVR 107 over data lines D0-D3. Interrupt logic 120 provides interrupt signals IP0-IP2 to processor 105 based on keyboard interrupt signal KBIRQ, vertical blanking interrupt VINT.H or other interrupt conditions not shown.

Keyboard interface logic 118 receives a clocking signal and serial data from keyboard 150 and control information from system control signal logic 109. Interface logic 118 receives data from and makes data available to processor 105 over data lines D0-D7. Data to be sent to keyboard 150 is provided over serial data line S0. A bell activation signal is provided to keyboard 150 from system control signal logic 107.

Figure 3A:
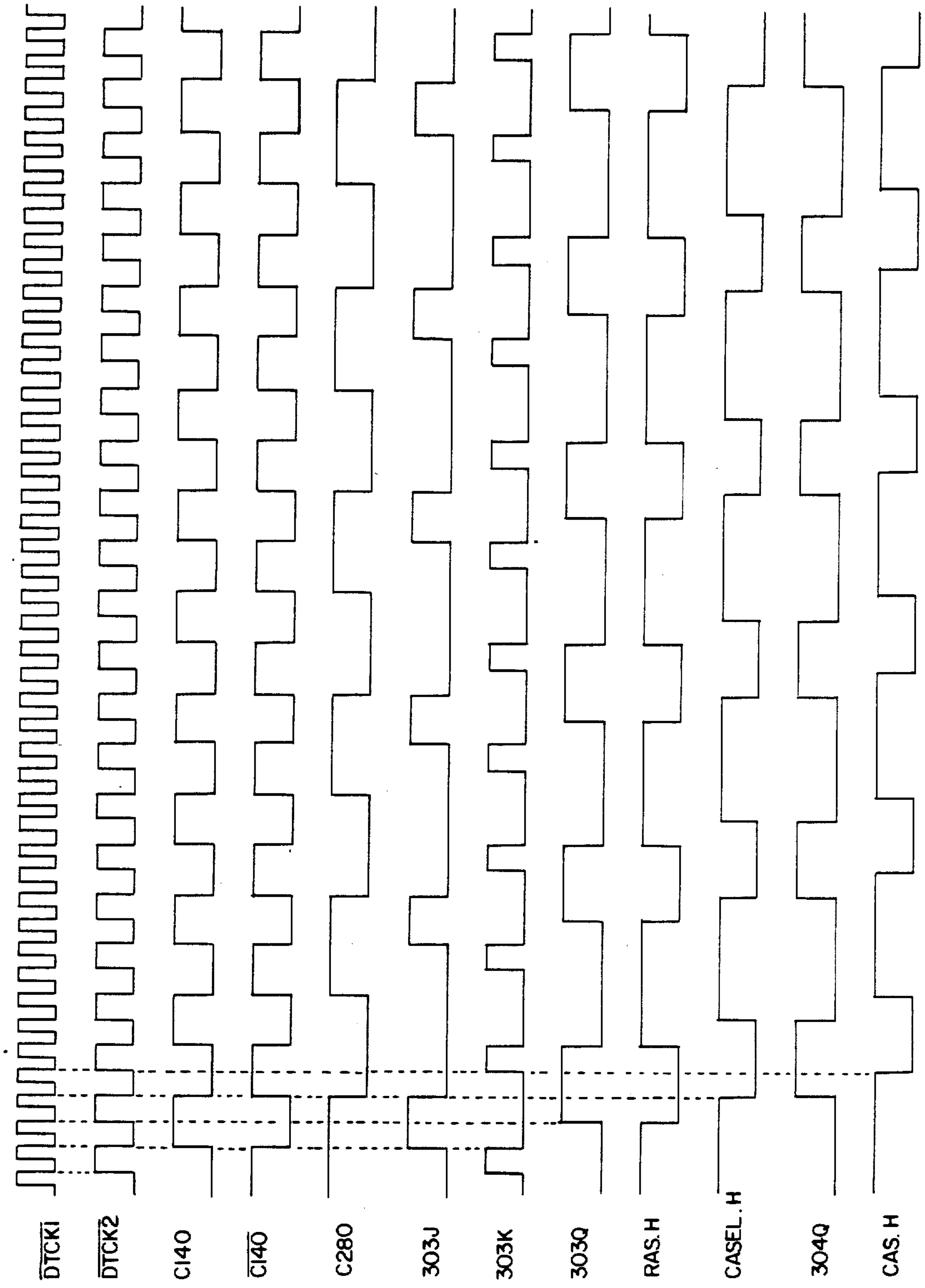
FIGS. 3A and B are timing diagrams illustrating the operation of memory timing and arbitration 103.
Figure 3B:
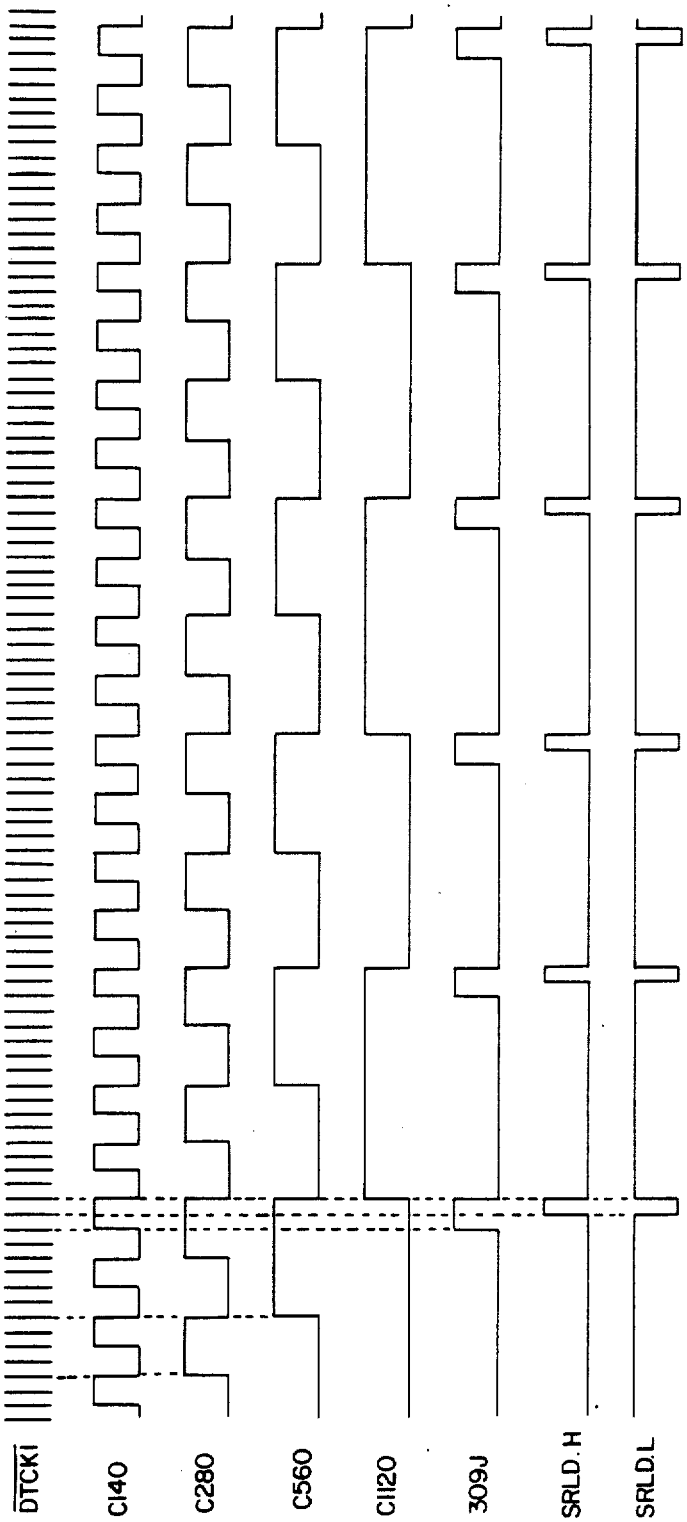

Referring to FIGS. 3, 3A and 3B, the operation of memory timing and arbitration 103 will be discussed. Flip flop 303 is clocked by the falling edge of NOTDTCK1 (approximately every 35 nanoseconds). Beginning at the left side of FIG. 3A, 303J and 303K are low. When NOTC140 and NOTDTCK2 both go high, 303K will go high for ½ of a DTCK2 period. At the next NOTDTCK1 falling edge, 303K goes low and 303J goes high. At the following NOTDTCK1 falling edge, RAS.H will be driven high and 303Q will go low. RAS.H is the row address strobe signal provided to the RAM memories in frame buffer logic 112. At the next rising edge of DTCK1, 304Q will be driven low and CASEL.H will be driven high. CASEL.H is a control signal provided to RAM address interface logic 111 and frame buffer logic 112 to select the proper information to be supplied as RAM address bits RA0-RA7. CAS.H is the column address strobe signal provided to the RAM memories in frame buffer logic 112. The outputs of flip flop 303 will not change until the next DTCK1 falling edge after 303J goes high. At this time 303Q goes high and RAS.H goes low. Since 303Q is high, CASEL.H will be driven low and 304Q will be driven high at the next DTCK1 rising edge. Finally, since 304Q is now high, CAS.H will be driven low at the following DTCK1 rising edge. The status of the apparatus is now the same as existed at the left edge of FIG. 3A and the foregoing actions will repeat.

Flip flop 309 is also clocked by the falling edge of NOTDTCK1. Considering first the 31.5 Khz case, SEL 315.H, which indicates that 31.5 Khz scan mode has been selected, will be high. The output of NAND gate 310 will, therefore, be high and will not affect the operation of flip-flop 309. Since the output of AND gate 308 will be high only when C140, C280 and C560 are all high simultaneously, SRLD.L will typically be high. SRLD.H will normally be low and the J and K inputs to flip flop 309 will be low. At the first NOTDTCK1 falling edge after the output of AND gate 308 goes high SRLD.H will go high and SRLD.L will go low. Since SRLD.H is returned to the K input of flip flop 309, SRLD.L will go high again at the next NOTDTCK1 falling edge. In the 31.5 Khz mode, therefore, SRLD.L has a period of 0.560 nanoseconds. Of the 560, SRLD.L is high for 525 nanoseconds and low for 35 nanoseconds (i.e. one DTCK1 period).

In the 15.75 Khz mode, SEL315.H will be low. When C1120 is also low, the output of NAND gate 310 will be low, forcing SRLD.L to stay high regardless of the output of AND gate 308. When C1120 is high (every other 560 nanoseconds) the output of NAND gate 310 is high and flip flop 309 will operate as in the 31.5 Khz mode. Therefore, in the 15.75 Khz mode, SRLD.L will have a period of 1120 nanoseconds, of which it is high for 1085 and low for 35.

Flip flop 314 is clocked by CAS.H and provides signals which indicate whether the memory access is data to be displayed (VIDEO.H high) or data not for display (NONVIDEO.H high). AND gate 313 receives A23, NOTC560 and the output of AND gate 312, which is normally high unless an interrupt situation exists. A falling edge of CAS.H, as described above, will occur twice every C560 period. For one of these CAS.H falling edges, NOTC560 will be low, therefore 314J will be low and VIDEO.H will be high. For alternating CAS.H falling edges, NOTC560 will be high and the output of gate 313 will depend on the state of A23. Processor 105 therefore controls the occurrence of NONVIDEO.H high by means of A23.

Looking now at FIG. 4, the operation of system control signal logic 109 will be discussed. Each 1-of-8 decoder 401, 402 and 405 receives address bits A12–A14 and, if the decoder is enabled, will provide one of eight possible output signals based on the three selecting inputs. Decoder 401 is enabled by the inverse of write signal WR.H, A15 and input/output read signal I/O-R.L. If enabled and if the appropriate address bits A12–A14 are present, decoder 401 will provide a low signal to keyboard interface logic 118 to indicate that data is to be read from keyboard 150. Decoder 402 provides an enabling input to 8 bit latch 403 when data on line D0 is to be stored in latch 403 at the address then present on address lines A1–A3. Latch 403 supplies 4 bits which are descriptive of the cursor color chosen by the terminal user (CUR0–CUR3), a keyboard bell activation signal (KYBD-BELL.L) and a keyboard load mode signal (KYBD-LD-MODE.L). Decoder 402 also provides an input to NAND gate 404 which, when low, serves to enable the clocking of latch 406 by clocking signal NOTC280. At each clocking pulse to latch 406, the data on lines D0–D7 is latched into latch 406 and provided as FB1SEL (frame buffer selected identifier), SEL315 (terminal scan mode selected), ERASE.L (control signal for blanking screen to a single color), and PIX-WR-MODE-0 and PIX-WR-MODE-1 (pixel write mode control signals).

WR-MASK.L (write mask enabling signal), KYBD-DATA-WR.L (enabling signal for writing data to keyboard 150), and an enabling signal to 8-bit latch 401 are provided by 1-of-8 decoder 405, when enabled by A15 and I/O-W.L, in response to address bits A12–A14. Latch 407, if enabled by decoder 405, stores the data on line D0 at the address indicated by A1–A3. KBIRQ-ENA.L, the keyboard interrupt enabling signal, is provided by latch 407.

Referring to FIG. 5, address decoding 110 receives and decodes address bits A18–A20, A22 and A23 to derive a series of control and status variables. FC0–FC2 and AS.H are provided to NAND gate 501. If AS.H is high, but one or more of FC0–FC2 are low, the output of gate 501 will be high and the output of NAND gate 502 will be low, thereby enabling decoder 503. Decoder 503 will supply four outputs based on the state of A22 and A23. One of the decoder 503 outputs is provided to NAND gate 507, a second output is PIX-ACC.L (pixel access control signal), and a third output is supplied as the enabling input to decoder 504. Decoder 504 provides four memory plane access signals based on the state of A18 and A19. These four outputs control the set of 4 memory planes to be accessed. The embodiment described herein uses only four memory planes (PL0–PL3) therefore only PL-0-3-ACC.L is required. However, the techniques and apparatus described herein are applicable to use with a greater number of planes, for example 16. PIX-ACC.L is provided as an input to NAND gate 505 as is WR.H. If both inputs are low, PIX-RD-ENA.L (pixel read mode enable) to frame buffer logic 112 is low. NAND gate 507 also receives A21 and if both gate 507 inputs are low, decoder 506 is enabled. Decoder 506 provides four output signals based on the state of A19 and A20. These signals include I/O-R.L (input/output read), I/O-W.L (input/output write) and UARTSEL.L (universal asynchronous receiver transmitter select).

Referring now to FIG. 7, keyboard interface logic 118 incorporates shift register logic to send data to and receive data from keyboard 150, and interrupt logic to alert processor 105 if keyboard 150 has data to send to terminal 100. Data from keyboard 150 is transmitted serially to shift register 701 over serial input line SI. Each transmission of data to or from keyboard 150 is 8 bits long. The data is accompanied by a synchronized clocking pulse NOTSCLK to allow the data to be properly read when received by interface logic 118. The received data is made available to processor 105 over data lines D0–D7. Similarly, data to be supplied to keyboard 150 is provided to shift register 701 over lines D0–D7 and is serially shifted out on S0 through NAND gate 704, which is enabled by KYBD-LD-MODE when data is going to keyboard 150.

Looking at FIG. 7A, when keyboard 150 has keystroke information to send to terminal 100, interrupt signal KBIRQ is generated. If keyboard interrupt enable, KBIRQ-ENA.L, is low from latch 407 in system control signal logic 109, the low output of NAND gate 705 will be latched into latch 706 at the next rising edge of C140. Latch 706 also receives VINT.H from video timing and sync 104. VINT.H indicates the display logic is in a vertical blanking period. The eight outputs of latch 706 are supplied to 8 input priority encoder 707 which generates 3 bits of interrupt information, IPL0–IPL2, to processor 105. Again, as will be appreciated by those skilled in the art, many system conditions may require interrupts to be generated. For illustration and clarity of presentation, only the keyboard interrupt and vertical interrupt signals are shown.

Looking now at FIG. 6, the operation of RAM address interface logic 111 will be discussed. The eight RAM addresses required by the memories in frame buffer logic 112 are generated by four 4-to-1 multiplexers 609–612. Each multiplexer receives two groups of four inputs and, based on the state of its A and B selection inputs, provides one of each group of four as its two outputs. The selection inputs for multiplexers 609–612 are NONVIDEO.H, which as discussed above indicates that the memory operation does not involve video information, and CASEL.H which, as discussed above, goes high midway between the row address strobe RAS.H and the column address strobe CAS.H.

If NONVIDEO.H and CASEL.H are both low, HA0–HA4 and VA1–VA3 are provided as RA0–RA7. As mentioned above HA0–HA5 and VA0–VA8 are generated by video timing and sync 104 and indicate horizontal and vertical status of the monitor's electron beam. If NONVIDEO.H is low and CASEL.H is high, HA5, VA0, VA4–VA8 and FB1SEL.H are provided as RA0–RA7. Similarly, when NONVIDEO.H is high, MH0–MH4 and A2–A4 will be selected when CASEL.H is low and A1, A5–A9, A20 and MHA5 will be selected when CASEL.H is high. The particular values for MHA0–MHA5 are chosen by 2-line multiplexers 601 and 602 based on the state of PIX-ACC.L. That is, if the memory access is to be in a pixel mode, the A inputs (i.e., A14–A19) to multiplexers 601 and 602 will be chosen. If the access will not be in a pixel mode, the B inputs will be chosen (i.e. A10–A15) as the source of MHA0–MHA5.

Multiplexer 602 is also used to generate signals to NAND gates 604 and 605. These outputs will be either A13 and its inverse, if PIX-ACC.L is low, or UDS.L and LDS.L if PIX-ACC.L is high. If NONVIDEO.H is low, both the upper and lower column address strobe enabling signals (CASU-ENA.H and CASL-ENA.H) will be high. If, however, NONVIDEO.H is high, the state of CASU-ENA.H and CASL-ENA.H will depend on the state of the signals selected by multiplexer 602.

Multiplexer 607 receives WR.H, the inverse of WR.H, ERASE.L and the output of NAND gate 606. Selection between the inputs is made based on the state of NONVIDEO.H. If a nonvideo operation is occurring, write enable signal WEN.H is based on the state of WR.H and multiplexer enable signal RAS-ALL.L is based on the inverse of WR.H. If a video operation is occurring, RAS-ALL.L is based on ERASE.L while WEN.H is high only if screen blanking has been enabled and commanded (i.e. ERASE-ENA.L and ERASE.L both low).

As a preface to discussion of the accessing and modifying of display data contained in frame buffer logic 112, it should be understood that the Motorola MC68000 microprocessor used in this embodiment has a 16 million byte processor logical address space. Therefore hexadecimal memory locations from 000000 to FFFFFF are available for use. RAM address interface logic 111 serves to map the logical address into the physical memory plane or planes being accessed. A memory plane as used herein and discussed below is constructed of 16 1 bit×64K RAM memories. A total of four memory planes are employed in this particular embodiment. This allows each plane to have one of the four bits in the pixel ordinal stored therein. The apparatus described herein can accommodate a larger number of planes (e.g. 16) to allow more bits of information per pixel.

The display image stored in terminal memory in this particular embodiment is 640 pixels (horizontal) by 512 pixels (vertical). The display image information is mapped into frame buffer logic 112 memory in two formats: a pixel access format and a word access format. In the pixel format, each plane has one bit of pixel ordinal information for each pixel. This format is useful in incremental drawing algorithms and other pixel oriented operations. In the word format, each plane is organized as 16-bit words. This format is useful for operations where many pixels need to be affected at one time. This, in effect, increases the data transmission bandwidth by allowing the processor to transmit more information in a shorter period of time.

In the pixel mode, three types of addressing are supported. The "normal mode" wherein one pixel ordinal is modified (one bit is written to each plane), "extended write mode 1" wherein an 8-bit byte of information is written to all enabled planes, and "extended write mode 2" wherein the identical 4-bit ordinal value is stored in 8 adjacent pixels. All three pixel modes return a single pixel ordinal in a read operation. The addressing formats for these modes are shown in Table 1 below.

TABLE 1

| | Address Bits | | | | | | |
|---|---|---|---|---|---|---|---|
| Mode | 23 21 | 20 | 19 | 10 | 9 | 1 | 0 |
| Normal | 110 | F | XMEM | | YMEM | | 0 |
| EM1 | 110 | F | SCOL | xxx | YMEM | | B |
| EM2 | 110 | F | SCOL | xxx | YMEM | | 0 |

In Table 1, F indicates the frame buffer to be used, XMEM is the horizontal pixel address, YMEM is the vertical pixel address, SCOL is the address of the 8-pixel column to be modified, B is set to be the same as the least significant bit in the SCOL address, and the x's indicate that the three least significant bits are ignored in these modes. In this particular embodiment horizontal addresses from 0 to 383 are reserved for terminal program storage and, therefore, the 640 horizontal pixel addresses begin at addresss 384 and continue to address 1023. Selection between pixel modes is controlled by the state of PX-WR-MODE-0 and PX-WR-MODE-1 as discussed below.

As stated above, the entire image memory is also mapped into the processor address space in a word format organized as 16-bit words. In the word format, 16-bit words may be read from or written to a single plane. The address format in this case is as follows:

| 23 21 | 20 | 19 16 | 15 | 11 | 10 | 1 | 0 |
|---|---|---|---|---|---|---|---|
| 100 | F | PL | WCOL | | WROW | | 0 |

In the above format, F identifies the frame buffer to be displayed, PL identifies the plane from which or to which the word is to be read, WCOL is the word column address and WROW is the word row address. The four PL bits allow for addressing 16 planes and the six WCOL bits allow the 40 columns of 16-bit words to be addressed. The upper and lower 8-bit data bytes can be accessed independently in the word format.

Referring now to FIGS. 8 and 8A, frame buffer logic 112 will be discussed. As mentioned above, in this embodiment each memory plane has 16 1×64 K RAM memories. These memories provide enough storage capacity for two complete display images. The four planes can therefore be considered to be divided into two separately addressable frame buffers, each frame buffer having ½ of each of the four planes PL0–PL3. The desired frame buffer is accessable by means of FB1SEL and the selection between the frame buffers is inherent in RAM address RA0–RA7 generated by RAM address interface logic 111. RAM address bits RA0–RA7 are provided to current driver arrays 825 and 826. The inverted addresses RA0A–RA7A are provided to PL0 and PL1 while RA0B–RA7B are provided to each of planes PL2 and PL3. If a pixel access operation is to take place, as indicated by PIX-ACC.L being low, the data on lines D0–D3 will be latched into latch 824. The outputs of latch 824 are each provided to a single memory plane. The inverted PIX-ACC.L signal is also provided as highest order input bit to 32×8 PROM 813. PROM 813 also receives PX-WR-MODE-1 and A11–A13. PX-WR-MODE-1 is low in the normal pixel mode and high in both of the extended pixel write modes.

If a pixel access is indicated by PIX-ACC.L and PX-WR-MODE-1 is low, only the PROM 813 output corresponding to the appropriate write enable signal will go high. If PX-WR-MODE-1 is high and a pixel access is indicated by PIX-ACC.L, all eight outputs of PROM 813 will be high since both extended pixel write modes involve modification of eight pixels. Also, if a pixel access is not occurring, all of the PROM 813 outputs will be high. The outputs of PROM 813 are nanded with the write enable signal WEN.H and the outputs are provided to all memory planes as RAM write enable signals WE0.L–WE7.L.

CAS.H is nanded with CASU-ENA.H and CASL-ENA.H from RAM address interface logic 111 to provide upper and lower column address strobe signals to all memory planes. Decoder 804 is enabled by PL-0-3-ACC.L and provides four outputs to multiplexer 805 based on address bits A16 and A17. Since the particular implementation described herein uses only four memory planes, PL-0-3-ACC.L will be low for any word access. The B inputs to multiplexer 805 are supplied from quad flip flop 806. This flip flop provides the ability to protect one or more memory planes while another plane or planes are being modified. Flip flop 806 receives data lines D0–D3 and is clocked by WR-MASK.L from system control signal logic 109. Since PL-0-3-ACC.L is always low in this embodiment, the selection between inputs to multiplexer 805 is controlled by VIDEO.H. If a video operation is underway, the output of NAND gate 802 will be high and the write protection outputs of quad flip flop 806 will be selected. If a video operation is not underway, the output of gate 802 will be low and the outputs of decoder 804 will be selected. The outputs of multiplexer 805 are nanded with RAS.H to create individual plane raster address strobe signals RAS-0.L -RAS-3-L. The output of NAND gate 802 is also provided to PL0–PL3 as word access signal PL-WORD-ACC.L.

If a read operation is to occur, as indicated by WR.H being low, the output of NAND gate 801 will go low thereby enabling decoder 803. Decoder 803 receives A16 and A17 and provides an individual word read signal to each of the memory planes. Only one of these four signals will be low since only one plane can be read at a time.

Referring now to FIGS. 9 and 9A, a diagram of one memory plane is shown. Planes PL0–PL3 are substantially identical in structure and operation and for clarity and brevity, only plane PL0 will be discussed. WE0.-L–WE7.L, RA0A–RA7A, RAS, CAS-U.L and CAS-L.L are provided directly to RAM array 906, discussed in more detail below. COLOR0 from latch 824 is supplied to the A inputs of 2-line multiplexers 901–904 while D0–D15 are supplied to the B inputs. The outputs of multiplexers 901–904 are provided as data inputs P0D0–P0D15 for storage in RAM array 906. Selection between the A and B inputs to multiplexers 901–904 is based on the output of NOR gate 905. Therefore, if either a word access operation is indicated by PL-WORD-ACC.L being low, or if extended pixel write mode 1 is indicated by PX-WR-MODE-0 being low, D0–D15 will be provided to RAM array 906. If both of the above signals are high, indicating either the normal pixel mode or extended pixel mode 2, COLOR0 will be provided at all outputs.

Output data P0D00–P0D015 from RAM array 906 are supplied to 1×8 multiplexers 907 and 908, latches 910 and 911 and shift registers 912 and 913. Multiplexer 907 receives P0D00–P0D07, NOTA14 as an enable, and A11–A13 as selection inputs while multiplexer 908 receives P0D08–P0D015, A14 as an enable and A11–A13 as selection inputs. The input to be provided at the output of multiplexers 907 and 908 is determined by A11–A13. Which of the two multiplexers will actually provide the output PIX0 is determined by the state of A14. Planes PL1–PL3 are similarly selecting one of the ouputs from the RAM arrays in those planes to create 4 bits of pixel information PIX0–PIX3. This information is provided to pixel read buffer 119, which is enabled by PIX-RD-ENA.L from address decoding 110. The contents of buffer 119 are made available to transceiver 107.

Latch 910 receives P0D00–P0D07 while latch 911 receives P0D08–P0D015. Both latches are enabled by CASEL.H going high and latched by PL-0-WORD-RD.L being low, indicating a word read operation for PL0 is selected. The 16 bits of information from RAM array 906 are made available to processor 105 over data lines D0–D15. P0D00–P0D015 are also provided to shift registers 912 and 913 where they are shifted out at the DTCK1 rate. The number of DTCK1 pulses required to shift out the 16 bits of information depends on the terminal scan mode. Referring briefly to FIG. 3, SRS0 will be low at all times in the 31.5 mode. In this case a bit will be shifted out of shift register 912 at each DTCK1 rising edge. In the 15.75 mode, SEL315.H is low therefore SRS0 will alternate between high and low in accordance with NOTDTCK2. In this case shift register 912 will shift data out only on alternating DTCK1 pulses. The SRLD.L pulse causes data from P0D00–P0D015 to be loaded in shift registers 912 and 913. Simultaneous shifting from the other 3 planes creates a 4 bit pixel data stream to cursor/video multiplexer 114.

Figure 10A:
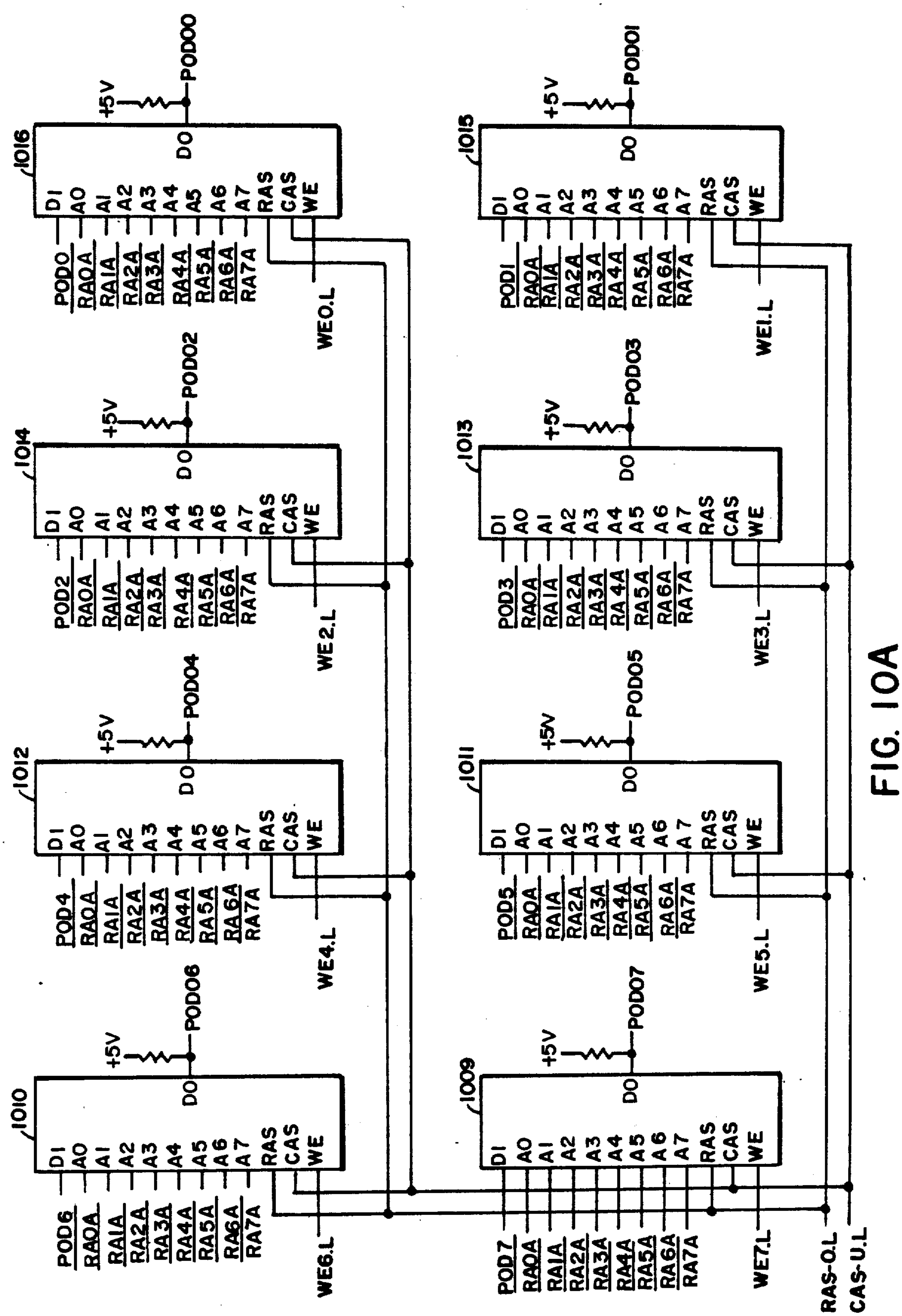

Referring now to FIGS. 10 and 10A, the operation of RAM array 906 will be discussed. Array 906 contains 16 substantially identical 1×64 K RAM memories 1001–1016 (for example 4164's). Each memory is organized as a matrix of storage locations having 256 rows and 256 columns. Each memory in PL0 is connected to RA0A–RA7A to provide row and column addresses. Each memory is also supplied with the row address strobe line, either the upper or lower column address strobe line, a write enable signal from the set WE0.-L–WE7.L and one of the data lines from P0D0–P0D15. In a read operation the following steps occur: a row address is provided to the RAM, the row strobe goes low, the row address is replaced with a column address, the column strobe goes low and the data from the selected memory location is provided at the memory output. Similar steps occur in a write operation, except that the write enable input will be low and the data provided at the data input DI will be written into the memory location specified by the row and column addresses. As can be seen from FIGS. 10 and 10A, the use of eight write enable signals WE0.L–WE7.L in combination with upper and lower column strobe signals CAS-U.L and CAS-L.L allows data to be written into individual RAM's in the set 1001–1016.

In summary, the present invention allows the memory of a video display terminal to be accessed and modified in various ways. Each access method has advantages for certain types of display operations, thereby allowing efficient use of time and terminal resources. The invention may be embodied in yet other specific forms without departing from the spirit or essential characteristics thereof. The present embodiment is therefore to be considered in all respects as illustrative and not restrictive. The scope of the invention is indicated by the appended claims rather than by the foregoing description, and all changes which come within the meaning and range of equivalency are intended to be embraced herein.

We claim:

1. Memory control apparatus for controlling memory access in a display terminal, said display terminal having a processor;

memory means for storing at least the display image, said memory means containing a plurality of memories, each memory having a plurality of addressable storage locations, said memories being functionally divided into a plurality of planes such that one data bit of each pixel is located in each plane, each of said planes containing a plurality of memories;

bus means for providing at least addresses and data from said memory means;

means for generating timing signals and means for supplying said timing signals to at least said processor, said memory means and said memory control apparatus, said memory control apparatus comprising:

means connected to said bus means and responsive to address selection signals from said processor and said timing signal generating means, for generating row and column addresses for said memories, said row and column address generating means including means for generating a first pair of addresses if the data from the memory is to be displayed, means for generating a second pair of addresses if a plurality of the planes are to be accessed and the access is for other than display and means for generating a third pair of address if only a single plane is to be accessed and the access is for other than display;

means, responsive to signals from said processor and said timing signal generating means, for generating a plurality of first row address strobe signal and first column address strobe signals, each said first row address strobe signal and each said first column address strobe signal being supplied only to the memories in one of said planes; and means responsive to signals from said processor and said timing signal generating means, for generating a plurality of second row address strobe signals and second column address signals, each said second row address strobe signal and each said second column address strobe signal being supplied to a portion of the memories in each of said planes.

2. The apparatus of claim 1 wherein said first pair of addresses is derived from the relative vertical and horizontal position of the electron beams of the display monitor of said terminal and said second and third pairs of row and column addresses are derived from address bits from said processor.

3. Memory control apparatus for controlling memory access in a display terminal, said display terminal having a processor;

memory means for storing at least the display image, said memory means containing a plurality of memories, each memory having a plurality of addressable storage locations, said memories being functionally divided into a pluraity of planes such that one data bit of each pixel is located in each plane, each of said planes containing a plurality of memories;

bus means for providing at least addresses and data from said memory means;

means for generating timing signals and means for supplying said timing signals to at least said processor, said memory means and said memory control apparatus, said memory control apparatus comprising:

means, connected to said bus means and responsive to signals from said processor and said timing signal generating means, for generating row and column addresses for said memories;

means, responsive to signals from said processor and said timing signal generating means, for generating a plurality of first row address strobe signal and first column address strobe signals, each said first row address strobe signal and each said first column address strobe signal being supplied only to the memories in one of said planes;

means, responsive to signals from said processor and said timing signal generating means, for generating a plurality of second row address strobe signals and second column address signals, each said second row address strobe signal and each said second column address strobe signal being supplied to a portion of the memories in each of said planes;

means for generating a plurality of write enabling signals to said memories, each of said write enabling signals being supplied to only one memory in each of said portions of each of said planes; and means for providing a data input from said processor to each of said memories, said data input providing means having selection means, responsive to signals from said processor, which simultaneously provides the same data bit to all memories in a plane if a single memory in each plane is to be modified and simultaneously provides each memory in the plane with a corresponding data bit from said bus means if a plurality of memories in that plane are to be modified.

* * * * *